United States Patent
Yao et al.

(10) Patent No.: US 10,895,477 B2
(45) Date of Patent: Jan. 19, 2021

(54) SINE-COSINE OPTICAL FREQUENCY ENCODER DEVICES BASED ON OPTICAL POLARIZATION PROPERTIES

(71) Applicant: General Photonics Corporation, Chino, CA (US)

(72) Inventors: Xiaotian Steve Yao, Diamond Bar, CA (US); Xiaojun James Chen, San Gabriel, CA (US)

(73) Assignee: General Photonics Corporation, Chino, CA (US)

( * ) Notice: Subject to any disclaimer, the term of this patent is extended or adjusted under 35 U.S.C. 154(b) by 52 days.

(21) Appl. No.: 15/975,757

(22) Filed: May 9, 2018

(65) Prior Publication Data
US 2018/0372517 A1 Dec. 27, 2018

Related U.S. Application Data

(60) Provisional application No. 62/503,919, filed on May 9, 2017.

(51) Int. Cl.
| | |
|---|---|
| *G01J 3/447* | (2006.01) |
| *G01D 5/347* | (2006.01) |
| *G01J 9/02* | (2006.01) |
| *G01J 3/02* | (2006.01) |
| *G01J 3/18* | (2006.01) |
| *G01B 9/02* | (2006.01) |

(52) U.S. Cl.
CPC ..... *G01D 5/34792* (2013.01); *G01B 9/02091* (2013.01); *G01J 3/0224* (2013.01); *G01J 3/1895* (2013.01); *G01J 3/447* (2013.01); *G01J 9/0246* (2013.01); *G01J 2009/0261* (2013.01)

(58) Field of Classification Search
CPC .... G01D 5/34792; G01J 3/0224; G01J 3/447; G01J 3/1895; G01J 3/45
See application file for complete search history.

(56) References Cited

U.S. PATENT DOCUMENTS

| | | | |
|---|---|---|---|
| 6,721,050 B2 * | 4/2004 | Vecer | G01J 3/447 356/364 |
| 2004/0240517 A1 * | 12/2004 | Howard | G01J 3/45 374/130 |
| 2005/0122514 A1 * | 6/2005 | Jang | G01B 11/0641 356/365 |
| 2010/0296152 A1 * | 11/2010 | Shiraishi | G02F 1/0136 359/301 |

* cited by examiner

*Primary Examiner* — Maurice C Smith
(74) *Attorney, Agent, or Firm* — Nixon & Vanderhye P.C.

(57) ABSTRACT

Optical polarization-based devices and techniques are provided to enable low cost construction and easy signal processing to measure the light frequency via measurements of signals associated with a delay between the two orthogonal polarizations after passing through a DGD element and the retardation value of the DGD element without directly measuring the optical frequency. The optical detection may be designed in various configurations. In particular, for example, the optical detection may split the optical output of the DGD into two optical beams with two different optical detectors so that the final frequency information can be deducted into a pair of sine and cosine functions, such as a pair of sine and cosine functions of measured optical signal levels and the retardation value of the DGD element.

34 Claims, 24 Drawing Sheets

US 10,895,477 B2

SINE-COSINE OPTICAL FREQUENCY ENCODER DEVICES BASED ON OPTICAL POLARIZATION PROPERTIES

CROSS-REFERENCE TO RELATED APPLICATION(S)

This patent document claims priority to and the benefits of U.S. Provisional Patent Application No. 62/503,919 entitled SINE-COSINE OPTICAL FREQUENCY ENCODER DEVICES BASED ON OPTICAL POLARIZATION PROPERTIES and filed on May 9, 2017, which is incorporated by reference as part of the disclosure of this patent document.

BACKGROUND

This patent application relates to optical devices capable of measuring optical frequency information of light.

SUMMARY

Optical polarization-based devices and techniques are disclosed to enable low cost construction and relatively easy signal processing to measure the light frequency via measurements of signals associated with a delay between the two orthogonal polarizations after passing through a DGD element and the retardation value of the DGD element without directly measuring the optical frequency. The optical detection may be designed in various configurations. In particular, for example, the optical detection may split the optical output of the DGD into two optical beams with two different optical detectors so that the final frequency information can be deducted into a pair of sine and cosine functions, such as a pair of sine and cosine functions of measured optical signal levels and the retardation value of the DGD element.

In one aspect, the disclosed technology can be implemented to provide an optical frequency encoder device for measuring an optical frequency of light to include an input port that receives light at an optical frequency to be measured; an optical polarizer in an optical path of the received light to output light in an input optical polarization; an optical differential delay (DGD) device oriented to have two orthogonal optical polarization axes of the DGD device to be at 45 degrees with respect to the input optical polarization and located to receive the light from the optical polarizer to cause a delay between light components in two orthogonal optical polarization axes of the DGD device; a second optical polarizer coupled to receive output light from the optical DGD device to produce an optical output beam; an optical detector coupled to receive the optical output beam and to produce a detector signal; and a processor coupled to receive the detector signal and to determine the optical frequency based on a measurement of a power level of the light received at the optical detector.

In another aspect, the disclosed technology can be implemented to provide an optical frequency encoder device for measuring an optical frequency of light to include an input port that receives light at an optical frequency to be measured; an input optical polarizer in an optical path of the received light to output light in an input optical polarization; an optical differential delay (DGD) device oriented to have two orthogonal optical polarization axes of the DGD device to be at 45 degrees with respect to the input optical polarization and located to receive the light from the input optical polarizer to cause a delay between light components in two orthogonal optical polarization axes of the DGD device; an optical beam splitter placed to receive light out of the DGD device and to split the received light out of the DGD device into a first beam along a first optical path and a second beam along a different second optical path; a first optical polarizer in the first optical path to receive from the first beam to produce a first polarized beam in a first polarization; a first optical detector in the first optical path to receive the first polarized beam to produce a first detector signal; a second optical polarizer placed in the second optical path of the second beam to produce a second polarized beam at a second polarization that is perpendicular to the first polarization; a second optical detector placed in the second optical path to receive the second polarized light beam and to produce a second detector signal; a quarter wave plate in front of either the second optical polarizer or the third optical polarizer to cause the first detector signal and the second detector signal to be sine and cosine signals that vary with a retardation value between two orthogonal polarizations of the DGD device; and a processor coupled to receive the first and second detector signals and to process the first and second detector signals to determine the optical frequency.

In yet another aspect, the disclosed technology can be implemented to provide an optical frequency encoder device for measuring an optical frequency of light to include an input port that receives light at an optical frequency to be measured; an input optical polarization device in an optical path of the received light to output two light beams with orthogonal optical polarizations; a polarization rotator placed in the first light beam to rotate polarization by 90 degrees; an optical differential delay (DGD) device coupled to receive the first and second light beams to cause a delay between the first and second light; an input optical polarizer placed between the polarization rotator and the DGD device and structured to have a polarization axis at 45 degrees with respect to two orthogonal optical polarization axes of the DGD device; an optical beam splitter placed to receive light out of the DGD device and to split the received light out of the DGD device into a first beam along a first optical path and a second beam along a different second optical path; a first optical polarizer in the first optical path to receive from the first beam to produce a first polarized beam in a first polarization; a first optical detector in the first optical path to receive the first polarized beam to produce a first detector signal; second optical polarizer placed in the second optical path of the second beam to produce a second polarized beam at a second polarization that is perpendicular to the first polarization; a second optical detector placed in the second optical path to receive the second polarized light beam and to produce a second detector signal; a quarter wave plate in front of either the second optical polarizer or the third optical polarizer to cause the first detector signal and the second detector signal to be sine and cosine signals that vary with a retardation value between two orthogonal polarizations of the DGD device; and a processor coupled to receive the first and second detector signals and to process the first and second detector signals to determine the optical frequency.

The above and other aspects and their implementations of the disclosed technology are described in greater detail in the drawings, the description and the claims.

DETAILED DESCRIPTION

Figure 1:
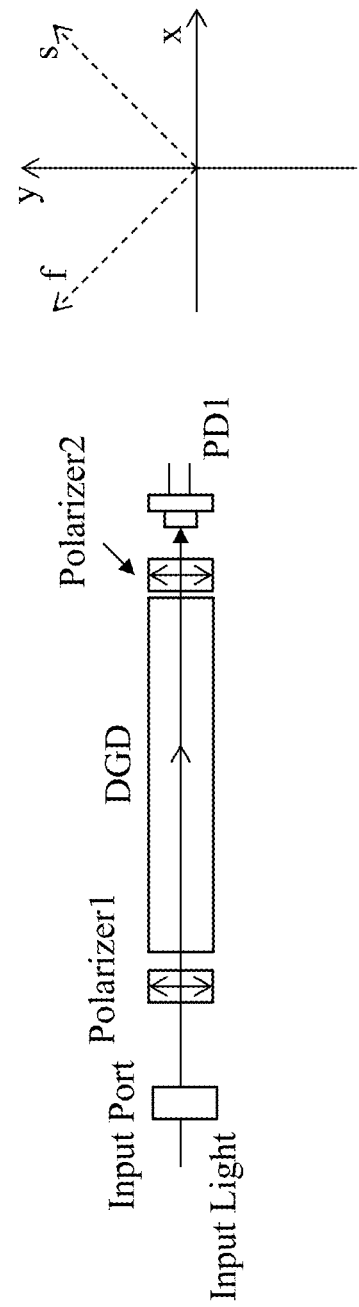
FIG. 1 shows an example of a first embodiment of the disclosed technology. Polarizer 1 oriented along y is used to keep input polarization 45 degrees from the slow or fast axis of the DGD element. The polarizer 2 can be oriented the same (along y) as or orthogonal (along x) to polarizer 1.

This patent document provides optical devices for measuring optical frequency information of light.

Many applications involve determining the optical frequency information of light. In some of those applications, it can be important or even critical to precisely measure or obtain the optical frequency information with a high resolution and at a high speed. Examples of such applications include laser frequency control, laser frequency analysis, fiber Bragg grating interrogation, frequency trigger signals for optical coherence tomography, optical frequency domain reflectometry, and chirped lidar systems for collision prevention for autonomous driving vehicles.

Measuring optical frequencies of light can be performed by an optical spectrum analysis in various ways, including, for example, 1) using a spatially dispersive element, such as a diffractive grating, to spatially separate different optical frequency components, 2) using a tunable narrow band filter, such as a Fabry-Perot resonator or a tunable fiber Bragg grating, to sequentially tune the bandpass frequency to select different frequency components out of the input light, and 3) performing fast Fourier transfer (FFT) on the output of a Michaelson or Mach-Zehnder interferometer as the path difference between the two interfering arms is varying. The resolution, spectral range, and measurement speed generally counter play with one another, and therefore good performances of all three parameters cannot be achieved simultaneously. For example, the resolution and measurement range of the Fabry-Perot filter based spectrum analyzer are inversely proportional to each other. Implementations of such techniques for achieving good resolutions tend to compromise the measurement range which is set by the device's free spectral range (FSR).

For fast scanning tunable laser sources with a scanning range of 160 nm and a scanning repetition rate of tens of kHz, it is desirable to measure the wavelength as a function of time as the laser's wavelength is scanned. It is difficult for perform such measurements by using above mentioned techniques.

Various devices can be used for obtaining the optical spectrum information based on polarization analysis of a light signal passing through a differential group delay (DGD) element that causes a delay between the two orthogonal polarizations. Such a method can overcome the short comings of some other optical spectrum analyzers, and simultaneously achieve high spectral resolution, wide spectra range, and high speed. Examples of such polarimer based optical spectrum analyzers (P-OSAs) include the examples in U.S. Pat. No. 7,693,419 B1 entitled "Optical spectrum analysis using optical interferometry" and U.S. Pat. No. 6,937,798 B1 entitled "Optical spectrum monitor" to Yao et al. which are incorporated by reference as part of the disclosure of this patent document and constitute part of the disclosure of this patent document.

This patent document includes examples of P-OSA devices to enable low cost construction and easy signal processing to measure the light frequency via measurements of signals associated with a delay between the two orthogonal polarizations after passing through a DGD element and the retardation value of the DGD element without directly measuring the optical frequency. For example, an optical frequency encoder device for measuring an optical frequency of light may include an input port that receives light at an optical frequency to be measured; an optical polarizer in an optical path of the receive light to output two light beams with orthogonal optical polarizations; an optical differential delay (DGD) device coupled to receive the two light beams from the optical polarizer to cause a delay between the two light beams in orthogonal optical polarizations; a second optical polarizer coupled to receive output light from the optical DGD device to produce an optical output beam; an optical detector coupled to receive the optical output beam and to produce a detector signal; and a processor coupled to receive the detector signal and to determine the optical frequency based on a measurement of a power level of the light received at the optical detector. The optical detection may be designed in various configurations. In particular, for example, the optical detection may split the optical output of the DGD into two optical beams with two different optical detectors so that the final frequency information can be deducted into a pair of sine and cosine functions, such as a pair of sine and cosine functions of measured optical signal levels and the retardation value of the DGD element, similar to that of a commonly used sine/cosine encoder for obtaining the angular or position information in motion control applications. Since sine/cosine encoders are widely used in the industry and the interpolation and applications of the signals are well known, such optical frequency encoders can be built by using the disclosed technology to achieve low cost and compact size for wide applications including, e.g., laser frequency measurement and control, interrogation via a fiber Bragg grating (FBG), and swept-frequency or chirped frequency sensor systems, as will be discussed below.

FIG. 1 illustrates an example of a first embodiment of the polametric optical frequency encoder based on the disclosed technology. An input port is provided to receive input light for measurement and the device includes two polarizers 1 and 2 and a DGD device or element between the two polarizers 1 and 2. Optical polarizer 1 is used to keep input polarization 45 degrees from the slow axis of the DGD element. An optional quarter wave plate can be placed between the DGD element and the optical polarizer 1 with the optical axis of the quarter wave plate oriented parallel or anti-parallel to the DGD element. Optical polarizer 2 is placed at the output side of the DGD device and is either oriented the same as polarizer 1 in the y direction or orthogonal to polarizer 1.

If $\tau$ is used to represent the DGD value of the DGD element, the retardation $\theta$ between the two orthogonal polarization components in the DGD is related to the optical frequency f and the DGD value $\tau$ by the following equation:

$$\theta = 2\pi f \tau \quad (1)$$

The complex amplitude of the electrical field of the light beam after the DGD element can be expressed as:

$$\vec{E} = (E_s e^{i\theta} \hat{s} + E_f \hat{f}) e^{i\varphi_0} \quad (2)$$

where $E_s$ and $E_f$ are the amplitudes of the electrical field along the slow and fast axes of the DGD, $\hat{s}$ and $\hat{f}$ are the unit vectors along the slow and fast directions, and $\varphi_o$ is the common phase. After passing through polarizer 2 with a unit vector of $$\hat{y} = \frac{1}{\sqrt{2}}(\hat{s} + \hat{f}),$$

$$\vec{E_y} = \vec{E} * \hat{y} = \frac{1}{\sqrt{2}}(E_s e^{i\theta} + E_f) e^{i\varphi_0} \quad (3)$$

$$I_y = |\vec{E_y}|^2 = \frac{1}{2}(E_s^2 + E_f^2 + 2E_s E_f \cos\theta) \quad (4)$$

Because the input polarization is oriented 45 degrees from the slow axis of the DGD, $E_s = E_f = E_0/\sqrt{2}$, $$I_y = \frac{1}{2}E_0^2(1 + \cos\theta) = I_0(1 + \cos\theta) \quad (5)$$

The optical retardation value $\theta$ can be obtained from Eq. (5) as $\theta = \cos^{-1}(I_y/I_0 - 1)$. Under the Equation (1), the optical frequency f can be determined by measuring $I_y$ with the optical detector PD1 in FIG. 1. Because the optical retardation value $\theta$ is a function of the ratio of $(I_y/I_0)$, the optical power $I_0$ should be kept the same power level all the time during the measurement to ensure the accuracy of the measurement of the optical frequency f.

Figure 2A:
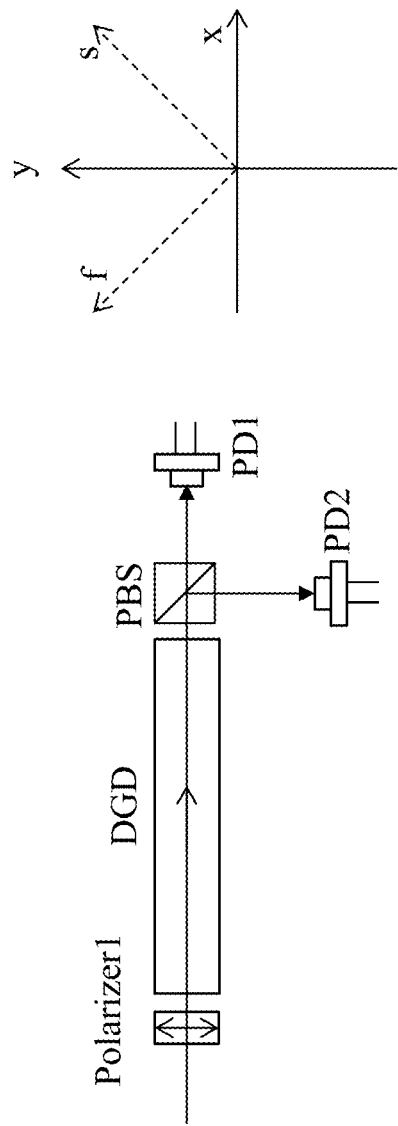
FIG. 2A shows an example of a 2nd embodiment of the disclosed technology. Polarizer 1 oriented along y is used to keep input polarization 45 degrees from the slow or fast axis of the DGD element. The PBS is oriented such that the passing axis is the same (along y) as polarizer 1 and the reflection axis is orthogonal (along x) to polarizer 1.

FIG. 2A illustrates an example of the $2^{nd}$ embodiment of an optical frequency encoder that does not need to keep the optical power constant. Polarizer 1 oriented along y is used to keep input polarization 45 degrees from the slow or fast axis of the DGD element. A polarization beam splitter (PBS) is placed at the output side of the DGD element and is oriented such that the passing axis of the PBS is the same (along y) as polarizer 1 and the reflection axis is orthogonal (along x) to polarizer 1. Different from FIG. 1, two optical detectors PD1 and PD2 are provided to receive the two output optical signals from the PBS, respectively. The detector signals from PD1 and PD2 are processed to determine the optical frequency of the input light.

Figure 2B:
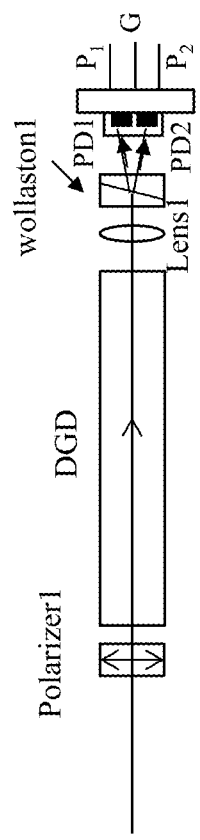
FIG. 2B shows another example of a device in which the PBS in FIG. 2a is replaced with a Wollaston prism and PD1 and PD2 in FIG. 2a are replaced with a dual chip detector.

FIG. 2B shows that the PBS in FIG. 2A is replaced with a Wollaston prism and PD1 and PD2 in FIG. 2A are replaced with a dual chip detector having two optical detectors formed on the same chip.

In both FIGS. 2A and 2B, the photocurrents detected in PD1 and PD2 are:

$$I_x = \alpha_x I_0 (1 - \cos\theta) \quad (6)$$

$$I_y = \alpha_y I_0 (1 + \cos\theta) \quad (7)$$

$$\theta = \cos^{-1}[(\alpha_x I_y - \alpha_y I_x)/(\alpha_x I_y + \alpha_y I_x)] \quad (8)$$

Eq. (8) shows that the optical retardation value $\theta$ is a function that is independent of the optical intensity $I_0$ of the input light so that the final measurement is independent of the optical power $I_0$. Accordingly, in FIGS. 2A and 2B, the measurements of the devices are no longer adversely affected by the fluctuation of the input optical power level of the light under detection.

For embodiments of FIG. 1 and FIGS. 2A/B, the range of θ is limited to π/2 or the frequency range is limited to ¼τ from Eq. (1). The larger of t, the better of the frequency resolution, however, the smaller of the measurement range. In order to overcome this limitation, a third embodiment is introduced.

Figure 3:
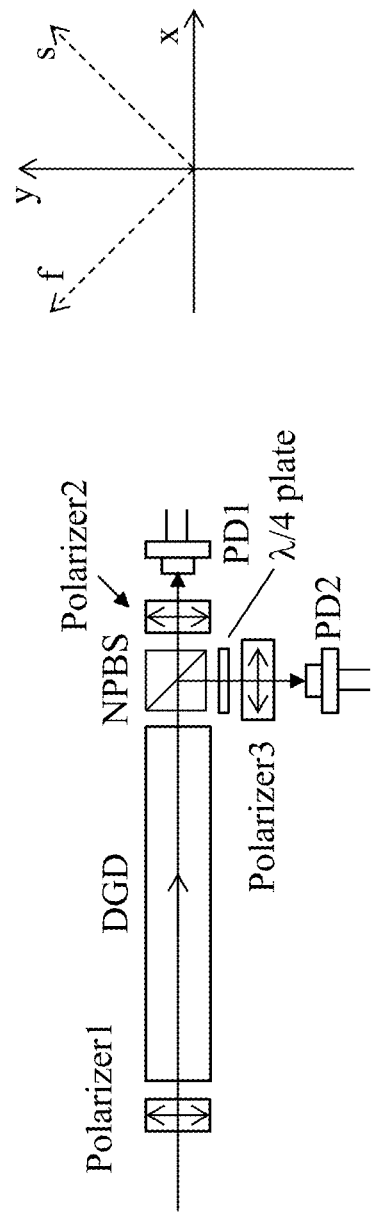
FIG. 3 shows an example of a 3rd embodiment of the polametric optical frequency encoder based on the disclosed technology. Polarizer 1 oriented along y is used to keep input polarization 45 degrees from the slow or fast axis of the DGD element. Quarter wave plate is oriented parallel or anti-parallel with the DGD element. All other polarizers can be oriented the same as or orthogonal polarizer 1.

FIG. 3 illustrates an example of the 3$^{rd}$ embodiment of the polametric optical frequency encoder based on the disclosed technology. Polarizer 1 oriented along y is used to keep input polarization 45 degrees from the slow or fast axis of the DGD element. All other polarizers can be oriented the same as or orthogonal polarizer 1.

A non polarization beam splitter (NPBS) is placed at the output side of the DGD element to split the output light from the DGD element into two optical beams (one by reflection and another by transmission) with the same optical power level. The transmitted beam out of the NPBS is directed to a polarizer 2 and a first optical detector PD1 and the other beam out of the NPBS (by reflection) is directed to go through a quarter wave plate with its optical axis oriented the same as the DGD element to pick up an additional 90 degree phase before passing through a polarizer 3 oriented in the y direction. A second optical detector PD2 is provided to receive the output from the polarizer 3 to measure the optical power of this beam. Alternatively, the quarter wave plate can be placed before polarizer 2.

In the above design, electric field of the two beams at the optical detectors PD1 and PD2 can be expressed as:

$$\vec{E_1} = \frac{a}{\sqrt{2}}(E_s e^{i\theta}\hat{s} + E_f\hat{f})e^{i\varphi_0} \quad (9a)$$

$$\vec{E_2} = \frac{b}{\sqrt{2}}(E_s e^{i(\theta+\frac{\pi}{2})}\hat{s} + E_f\hat{f})e^{i\varphi_0}, \quad (9b)$$

where the coefficient a and b represent different losses between the two beams from the imperfection of the NPBS. Because the input polarization is oriented 45 degrees from the slow axis of the DGD, $E_s=E_f=E_0/\sqrt{2}$, the electrical field of the two beams can be rewritten as:

$$\vec{E_1} = \frac{a}{2}E_0(e^{i\theta}\hat{s} + \hat{f})e^{i\varphi_0} \quad (10a)$$

$$\vec{E_2} = \frac{b}{2}E_0(e^{i(\theta+\frac{\pi}{2})}\hat{s} + \hat{f})e^{i\varphi_0}, \quad (10b)$$

After the beams passing through a polarizer oriented in the y direction, $$\hat{y} = \frac{1}{\sqrt{2}}(\hat{s} + \hat{f}) \quad (11)$$

The corresponding photocurrents $I_1$ and $I_2$ in photodetectors PD1 and PD2 are:

$$I_1 = \alpha_1[1+\cos\theta] \quad (12a)$$

$$I_2 = \alpha_2[1-\sin\theta], \quad (12b)$$

where $\alpha_1$ and $\alpha_2$ are the responsivities of PD1 and PD2 respectively, including the signal losses in the optical components, including NPBS, and the wave plate.

For applications with fast tunable lasers, $\theta=2\pi f\tau$ can be fast varying, a high pass filter can be used to block the DC component in Eqs. (12a) and (12b). The photo voltages from the two optical detectors PD1 and PD2 can be expressed as:

$$V_1 = V_{10}\cos\theta \quad (13a)$$

$$V_2 = -V_{20}\sin\theta \quad (13b)$$

The above two outputs from two optical detectors PD1 and PD2 can be processed by using a suitable sine/cosine interpolation algorithm. For example, some well-known sine/cosine interpolation algorithms may be applied to obtain both the direction and the amplitude of θ variations, even when θ changes multiple of 2π. The frequency variation can be readily obtained as:

$$\Delta f = \frac{1}{2\pi}\Delta\theta/\tau \quad (14)$$

Even for the case that of extremely slow varying frequency in which the high pass filter is not feasible, it is possible to use a reference tunable laser with a constant power to obtain the amplitude $V_{10}$ and $V_{20}$. Define new variable Y1 and Y2 as $$Y_1 = (V_1 - V_{10})/V_{10} \quad (15a)$$

$$Y_2 = (V_2 - V_{20})/V_{20} \quad (15b)$$

$$Y_1 = \cos\theta \quad (16a)$$

$$Y_2 = -\sin\theta \quad (16b)$$

The slow frequency variation can also be obtained. However, such an approach requires careful calibration or measurement of $V_{i0}$ at different temperatures.

FIG. 3 is an example of one implementation of the disclosed technology for an optical frequency encoder device for measuring an optical frequency of light. Such a decoder includes an input port that receives light at an optical frequency to be measured; an input optical polarizer in an optical path of the received light to output light in an input optical polarization; an optical differential delay (DGD) device oriented to have two orthogonal optical polarization axes of the DGD device to be at 45 degrees with respect to the input optical polarization and located to receive the light from the input optical polarizer to cause a delay between light components in two orthogonal optical polarization axes of the DGD device; an optical beam splitter placed to receive light out of the DGD device and to split the received light out of the DGD device into a first beam along a first optical path and a second beam along a different second optical path; a first optical polarizer in the first optical path to receive from the first beam to produce a first polarized beam in a first polarization; a first optical detector in the first optical path to receive the first polarized beam to produce a first detector signal; a second optical polarizer placed in the second optical path of the second beam to produce a second polarized beam at a second polarization that is perpendicular to the first polarization; a second optical detector placed in the second optical path to receive the second polarized light beam and to produce a second detector signal; a quarter wave plate in front of either the second optical polarizer or the third optical polarizer to cause the first detector signal and the second detector signal to be sine and cosine signals that vary with a retardation value between two orthogonal polarizations of the DGD device; and a processor coupled to receive the first and second detector signals and to process the first and second detector signals to determine the optical frequency.

Figure 4:
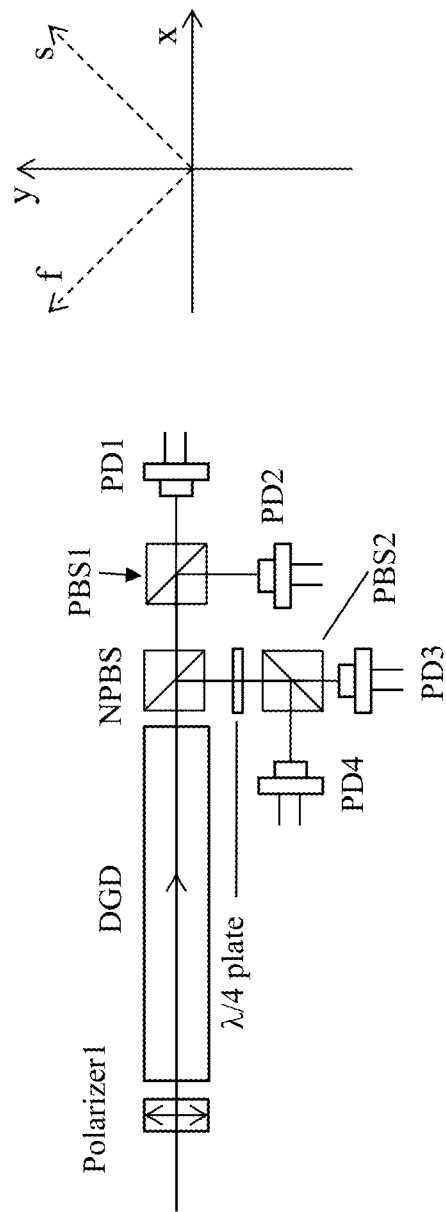
FIG. 4 shows an example of a 4th embodiment of the polametric optical frequency encoder based on the disclosed technology. Polarizer 1 oriented along y is used to keep input polarization 45 degrees from the slow or fast axis of the DGD element. Quarter wave plate is oriented parallel or anti-parallel with the DGD element. The passing axis of PBS1 and PBS2 are either oriented the same as polarizer 1 or orthogonal to polarizer 1.

FIG. 4 shows an example of a 4$^{th}$ embodiment of the disclosed technology in which two polarization beam splitters are used to replace the two polarizers after the NPBS in FIG. 3. A quarter wave plate can be placed either before PBS1 or PBS2. The corresponding photocurrents in the four photodetectors for the case the quarter wave plate is placed in front of PBS2 can be expressed as:

$$I_{1x} = \alpha_{1x}[1+\cos\theta] \quad (17a)$$

$$I_{1y} = \alpha_{1y}[1-\cos\theta] \quad (17b)$$

$$I_{2x} = \alpha_{2x}[1-\sin\theta] \quad (18a)$$

$$I_{2y} = \alpha_{2y}[1+\sin\theta], \quad (18b)$$

where $I_{1x}$, $I_{1y}$, $I_{2x}$, and $I_{2y}$ are the photocurrents detected by four optical detectors PD1, PD2, PD3, and PD4 respectively, $\alpha_{1x}$, $\alpha_{1y}$, $\alpha_{2x}$, and $\alpha_{2y}$ are the responsivities of the four optical detectors, respectively. Note that the different signal losses in the optical components, such as in NPBS, PBS1, PBS2, and the quarter wave plates can be included in the four alpha coefficients.

The four photocurrents can be converted into voltages trans-impedance amplifiers as:

$$V_{1x} = V_{10}[1+\cos\theta] \quad (19a)$$

$$V_{1y} = V_{10}[1-\cos\theta] \quad (19b)$$

$$V_{2x} = V_{20}[1-\sin\theta] \quad (20a)$$

$$V_{2y} = V_{20}[1+\sin\theta], \quad (20b)$$

where the voltage amplitude $V_{i0}$ in each pair of detectors (PD1, PD2), and (PD3, PD4) are made equal by properly adjusting the gains in the trans-impedance amplifiers, or in the digital domain numerically when the four signals are digitized for further processing.

$$=(V_{1x}-V_{1y})/(V_{1x}+V_{1y})=\cos\theta \quad (21a)$$

$$Y_2=(V_{2x}-V_{2y})/(V_{2x}+V_{2y})=\sin\theta \quad (21b)$$

Again, by using the sine/cosine interpolation algorithms, θ and thus optical frequency change (θ=2πfτ) can be obtained. The advantage of using the embodiment in FIG. 4 in comparison with that in FIG. 3 is that no prior calibration is required. In addition, the common mode noise of the light source can also be eliminated.

Figure 5:
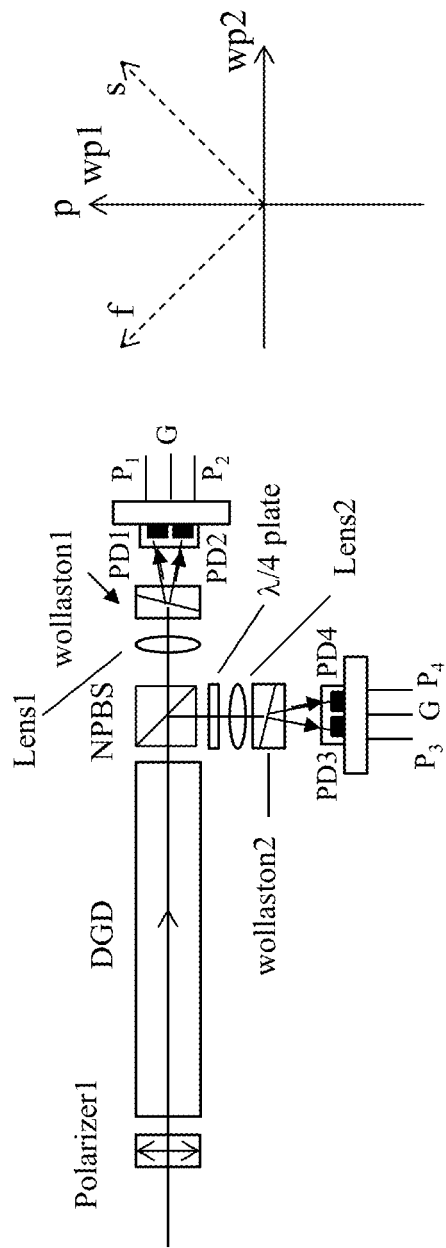
FIG. 5 shows an example of a 5th embodiment of the polametric optical frequency encoder based on the disclosed technology. Polarizer 1 is used to keep input polarization 45 degrees from the slow axis of the DGD element. Quarter wave plate is oriented parallel or anti-parallel with the DGD element. Wollaston prisms are used to separate two orthogonal polarization components into different directions. Dual chip photodetectors are used to detect the two polarization components. The axies of the Wollaston prisms are oriented parallel with polarizer 1 or orthogonal to polarizer 1. wp1 and wp2 are the unit directions of the two Wollaston prisms.

FIG. 5 illustrates an example of a 5$^{th}$ embodiment of the disclosed technology in which the polarization beam splitters are replaced with two Wollaston prisms and the single chip photodetectors are replaced with dual chip photodetectors. The advantage of this configuration is the compact size and low cost, as compared with that of FIG. 4.

Figure 6:
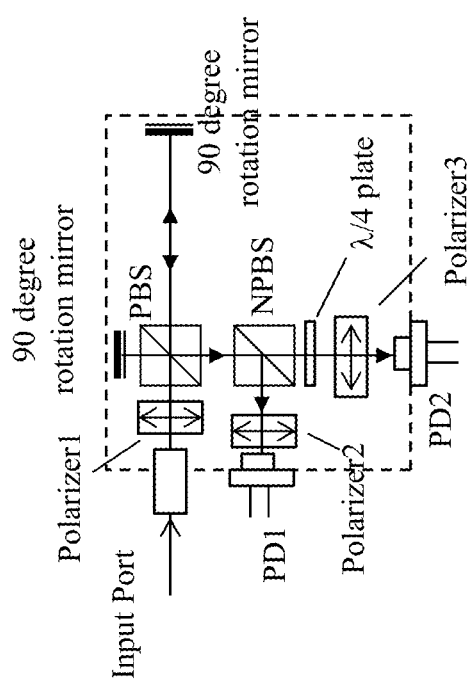
FIG. 6 shows an example of a 6th embodiment of the polametric optical frequency encoder based on the disclosed technology. Polarizer 1 is used to keep input polarization 45 degrees from PBS. Quarter wave plate is oriented parallel or anti-parallel with PBS. All other polarizers are oriented the same as polarizer 1 or orthogonal to polarizer 1.

FIG. 6 illustrates an example of a 6$^{th}$ embodiment of the disclosed technology. In this configuration, the DGD element is made with free-space optics, instead of birefringence crystal as in the embodiment of FIG. 3. The free-space DGD is made with a polarization beam splitter (PBS) and two reflectors to reflect the beams back to the PBS. A polarization rotator is used to rotate the state of polarization (SOP) by 90 degrees upon light reflection. Such a reflector can be made by putting a 45-degree faraday rotator in the beam or putting a half wave plate. Polarizer 1 is used to keep input polarization 45 degrees from PBS. Quarter wave plate is oriented parallel or anti-parallel with PBS. All other polarizers are oriented the same as polarizer 1.

Figure 7:
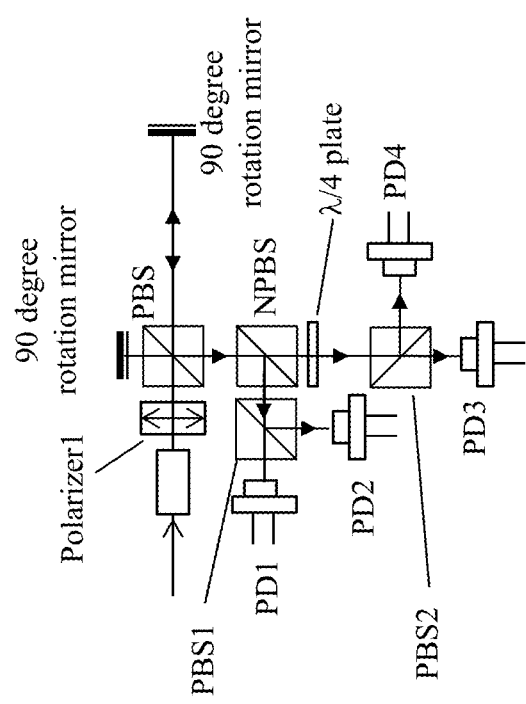
FIG. 7 shows an example of a 7th embodiment of the polametric optical frequency encoder based on the disclosed technology. Polarizer 1 is used to keep input polarization 45 degrees from PBS. Quarter wave plate is oriented parallel or anti-parallel with PBS. All other PBS' are oriented the same as polarizer 1 or orthogonal to polarizer 1.

FIG. 7 illustrates a 7$^{th}$ embodiment of the disclosed technology, in which two polarization beam splitter cubes are used to replace the two polarizers after the NPBS in FIG. 6. Additional two photodetectors are used as in FIG. 4. This configuration is almost the same as that in FIG. 4, except that the DGD element in FIG. 4 is replaced with a free-space based optics, including a PBS, two polarization rotators, and two reflection mirrors.

Figure 8:
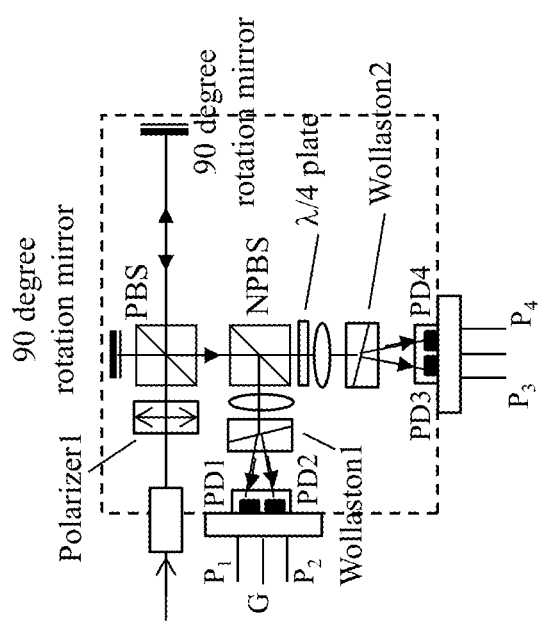
FIG. 8 shows an example of an 8th embodiment of the polametric optical frequency encoder based on the disclosed technology. Polarizer 1 is used to keep input polarization 45 degrees from PBS. Quarter wave plate is oriented parallel or anti-parallel with PBS. Wollaston prisms are used to separate two polarization components onto the PD chips of the dual chip PD.

FIG. 8 illustrates an 8$^{th}$ embodiment of the disclosed technology in which the two polarization beam splitter cubes are replaced with two Wollaston prisms and the single chip photodetectors are replaced with dual chip photodetectors. The advantage of this configuration is the compact size and low cost, as compared with that of FIG. 7.

Figure 9:
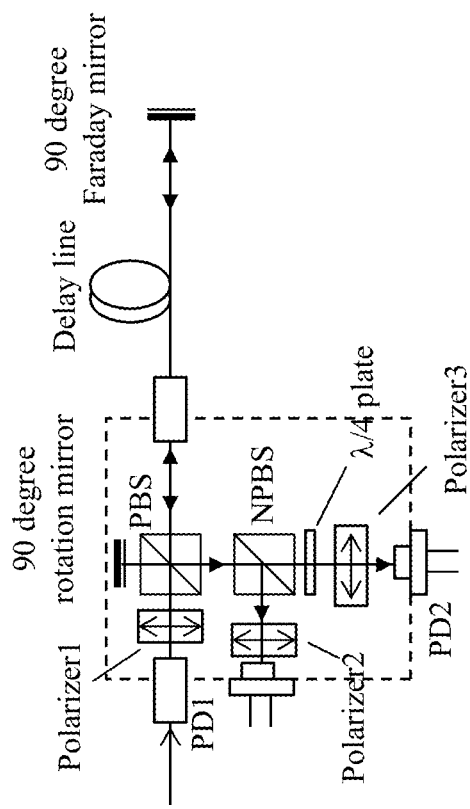
FIG. 9 shows an example of a 9th embodiment of the polametric optical frequency encoder based on the disclosed technology. Polarizer 1 is used to keep input polarization 45 degrees from PBS. Quarter wave plate is oriented parallel or anti-parallel with PBS. All other polarizers are oriented the same as polarizer 1. The fiber based delay line is used to increase the differential group delay for better frequency measurement sensitivity. It can be any of the following delay line: fixed fiber delay, variable delay, motorized variable delay, switchable variable delays.

FIG. 9 illustrates a 9$^{th}$ embodiment of the polametric optical frequency encoder. Polarizer 1 is used to keep input polarization 45 degrees from PBS. Quarter wave plate is oriented parallel or anti-parallel with PBS. All other polarizers are oriented the same as polarizer 1. The configuration is almost the same as that of FIG. 6, except that an optical fiber based delay line is added to an optical path after the PBS. The fiber based delay line is used to increase the differential group delay for better frequency measurement sensitivity. It can be any of the following delay line: fixed fiber delay, variable delay, motorized variable delay, switchable variable delays.

Figure 10:
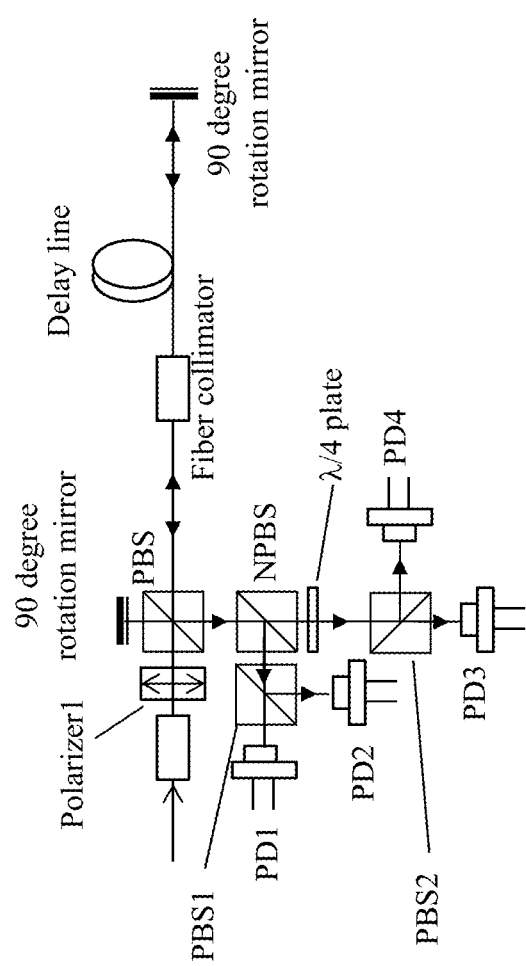
FIG. 10 shows an example of a 10th embodiment of the polametric optical frequency encoder based on the disclosed technology. Polarizer 1 is used to keep input polarization 45 degrees from PBS. Quarter wave plate is oriented parallel or anti-parallel with PBS. PBS1 and PBS2 are oriented the same as polarizer 1.

FIG. 10 illustrates a 10$^{th}$ embodiment of the disclosed technology, in which two polarization beam splitter cubes are used to replace the two polarizers after the NPBS in FIG. 9. Two additional two photodetectors are used compared with those in FIG. 9.

Figure 11:
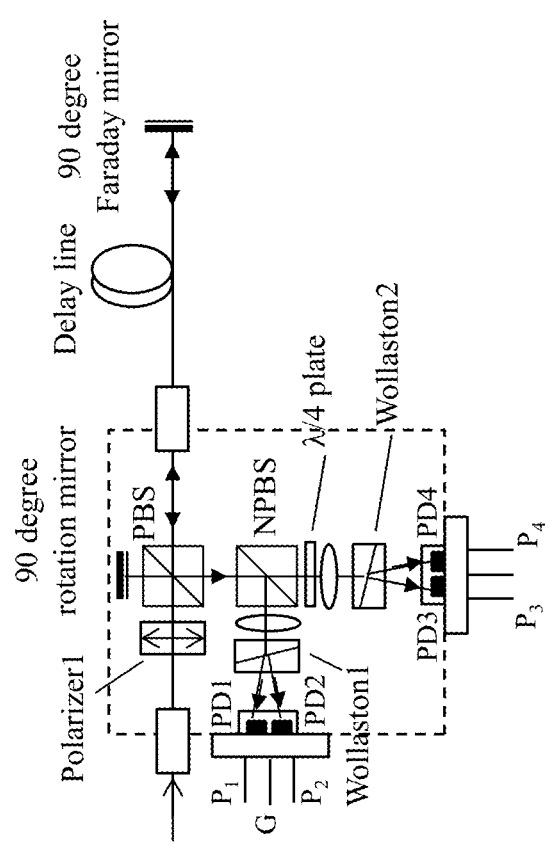
FIG. 11 shows an example of 11th embodiment of the polametric optical frequency encoder based on the disclosed technology. Polarizer 1 is used to keep input polarization 45 degrees from PBS. Quarter wave plate is oriented parallel or anti-parallel with PBS. Wollaston prisms are used to separate two polarization components onto the PD chips of the dual chip PD. The fiber based delay line is used to increase the differential group delay for better frequency measurement sensitivity. It can be any of the following delay line: fixed fiber delay, variable delay, motorized variable delay, switchable variable delays.

FIG. 11 illustrates a 11$^{th}$ embodiment of the polametric optical frequency encoder. This configuration is almost the same as that in FIG. 10, except that the Wollaston prisms are used to replace the PBS1 and PBS2 and dual-chip photodetectors are used to replace the single chip detectors in FIG. 10.

Figure 12:
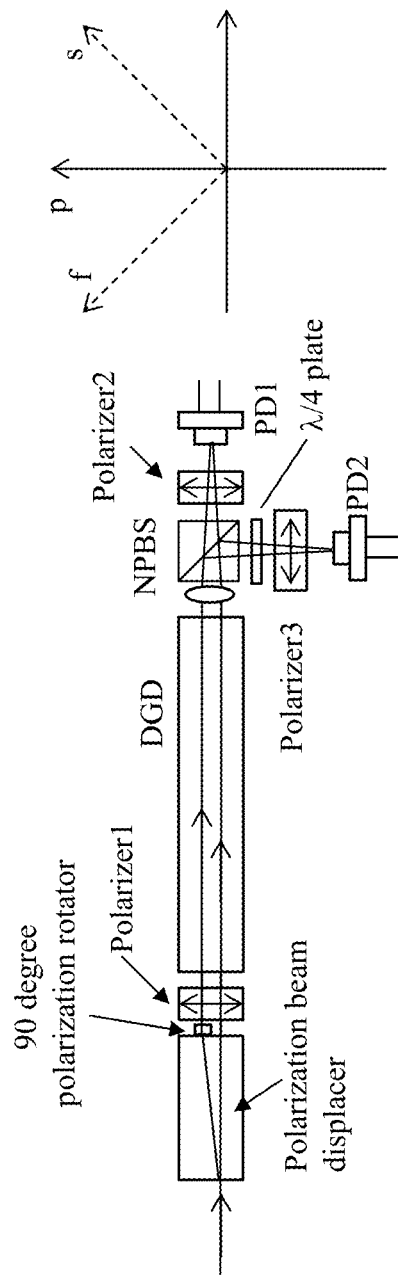
FIG. 12 shows an example of a 1st embodiment of a polarization insensitive polametric optical frequency encoder based on the disclosed technology. The input beam of an arbitrary polarization first enters a polarization displacer made with a birefringence crystal in which the two beams 1 and 2 with the orthogonal polarization components are displaced. A 90 degree polarization rotator is then placed in one of the beam to make the two beams having the same polarization state. Polarizer 1 oriented 45 degrees from the slow axis of the DGD element is used to clean up the polarization deviation from the imperfections of the polarization rotator made of either a half-wave plate or a Faraday rotator. Quarter wave plate is oriented parallel or anti-parallel with the DGD element. All other polarizers are oriented the same as polarizer 1. A lens with a properly selected focal length is used to focus two beams onto the photodetector chip.

FIG. 12 illustrates a first embodiment of a polarization insensitive polametric optical frequency encoder. The input beam of an arbitrary polarization first enters a polarization displacer made with a birefringence crystal in which the two beams 1 and 2 with the orthogonal polarization components are displaced. A 90 degree polarization rotator is then placed in one of the beam to make the two beams having the same polarization state. Polarizer 1 oriented 45 degrees from the slow axis of the DGD element is used to clean up the polarization deviation from the imperfections of the polarization rotator made of either a half-wave plate or a Faraday rotator. Quarter wave plate is oriented parallel or anti-parallel with the DGD element. All other polarizers are oriented the same as polarizer 1. A lens with a properly selected focal length is used to focus two beams onto the photodetector chip.

FIG. 12 is an example of one implementation of the disclosed technology for an optical frequency encoder device for measuring an optical frequency of light. Such a decoder includes an input port that receives light at an optical frequency to be measured; an input optical polarization device in an optical path of the received light to output two light beams with orthogonal optical polarizations; a polarization rotator placed in the first light beam to rotate polarization by 90 degrees; an optical differential delay (DGD) device coupled to receive the first and second light beams to cause a delay between the first and second light; an input optical polarizer placed between the polarization rotator and the DGD device and structured to have a polarization axis at 45 degrees with respect to two orthogonal optical polarization axes of the DGD device; an optical beam splitter placed to receive light out of the DGD device and to split the received light out of the DGD device into a first beam along a first optical path and a second beam along a different second optical path; a first optical polarizer in the first optical path to receive from the first beam to produce a first polarized beam in a first polarization; a first optical detector in the first optical path to receive the first polarized beam to produce a first detector signal; second optical polarizer placed in the second optical path of the second beam to produce a second polarized beam at a second polarization that is perpendicular to the first polarization; a second optical detector placed in the second optical path to receive the second polarized light beam and to produce a second detector signal; a quarter wave plate in front of either the second optical polarizer or the third optical polarizer to cause the first detector signal and the second detector signal to be sine and cosine signals that vary with a retardation value between two orthogonal polarizations of the DGD device; and a processor coupled to receive the first and second detector signals and to process the first and second detector signals to determine the optical frequency.

Figure 13:
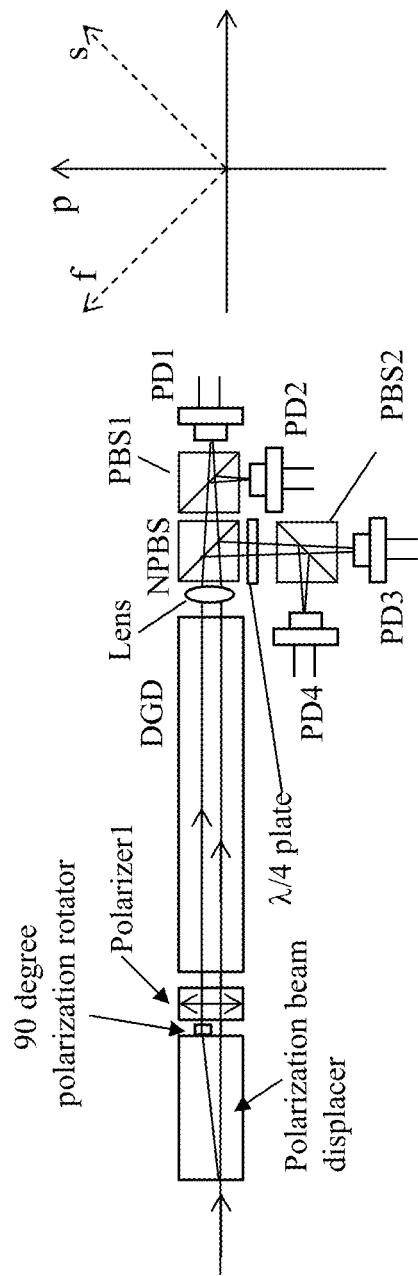
FIG. 13 shows an example of a $2^{nd}$ embodiment of a polarization insensitive polametric optical frequency encoder based on the disclosed technology. The input beam of an arbitrary polarization first enters a polarization displacer made with a birefringence crystal in which the two beams 1 and 2 with the orthogonal polarization components are displaced. A 90 degree polarization rotator is then placed in one of the beam to make the two beams having the same polarization state. Polarizer 1 oriented 45 degrees from the slow axis of the DGD element is used to clean up the polarization deviation from the imperfections of the polarization rotator made of either a half-wave plate or a Faraday rotator. Quarter wave plate is oriented parallel or anti-parallel with the DGD element. PBS1 and PBS2 are oriented the same as polarizer 1 and are used to replace the polarizer 2 and polarizer 3. A lens with a properly selected focal length is used to focus the beams onto the photodetector chips.

FIG. 13 illustrates a second embodiment of a polarization insensitive polametric optical frequency encoder. This configuration is almost the same as that of FIG. 12, except that PBS1 and PBS2 are used to replace polarizers 2 and 3, and four photodetectors are used to detect the light powers of the four beams from the two PBS'.

Figure 14:
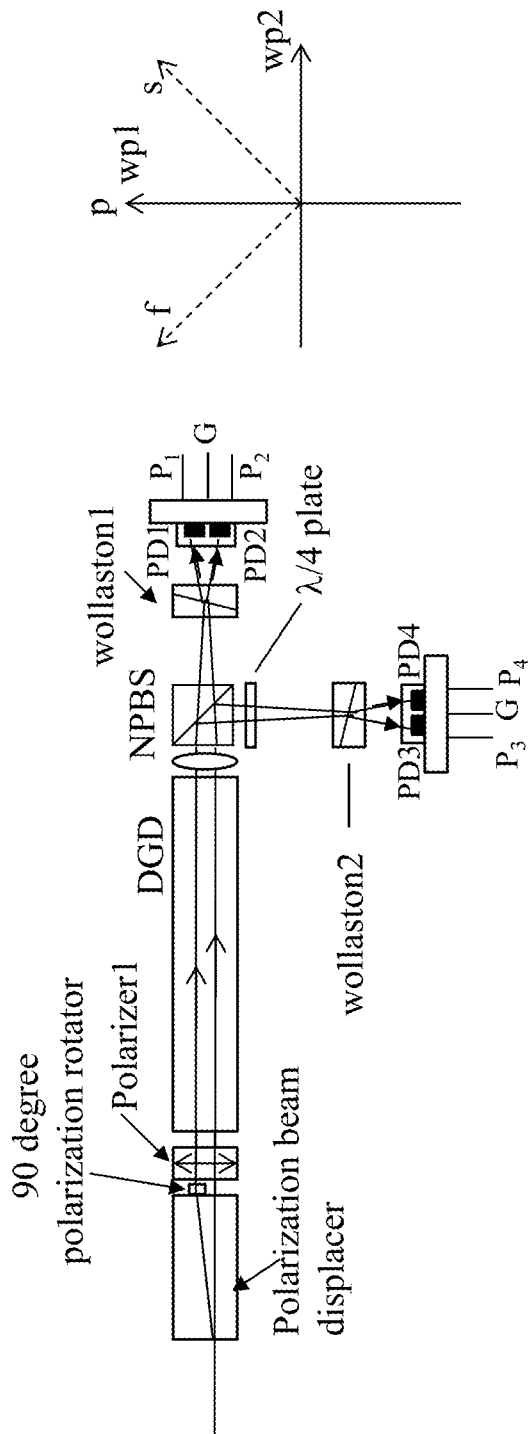
FIG. 14 shows an example of a 3rd embodiment of a polarization insensitive polametric optical frequency encoder based on the disclosed technology. The input beam of an arbitrary polarization first enters a polarization displacer made with a birefringence crystal in which the two beams 1 and 2 with the orthogonal polarization components are displaced. A 90 degree polarization rotator is then placed in one of the beam to make the two beams having the same polarization state. Polarizer 1 oriented 45 degrees from the slow axis of the DGD element is used to clean up the polarization deviation from the imperfections of the polarization rotator made of either a half-wave plate or a Faraday rotator. Quarter wave plate is oriented parallel or anti-parallel with the DGD element. Wollaston prisms (wp1 and wp2) are used to separate two orthogonal polarization components into different directions. Dual chip photodetectors are used to detect the two polarization components. The axis of the Wollaston prisms are oriented parallel with polarizer 1. wp1 and wp2 are the unit directions of the two Wollaston prisms.

FIG. 14 illustrates a third embodiment of a polarization insensitive polametric optical frequency encoder. This configuration is almost the same, except that two Wollaston prisms (wp1 and wp2) are used to replace the two polarization splitter cubes to separate two orthogonal polarization components into different directions. Dual chip photodetectors are used to detect the two polarization components. The axis of the Wollaston prisms is oriented parallel with polarizer 1. wp1 and wp2 are the unit directions of the two Wollaston prisms.

Figure 15:
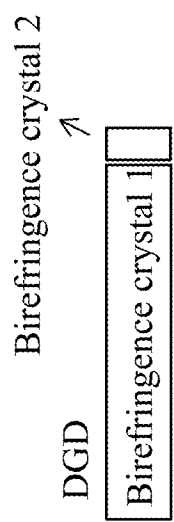
FIG. 15 shows an example of a temperature insensitive DGD device that can be used in the devices in FIGS. 1-5 and 12-14 based on the disclosed technology. This DGD device is made with two different birefringence crystals of opposite temperature coefficients of birefringence. For example, YVO4 and LiNOb3. When the lengths of the two different crystals are chosen, zero temperature coefficients of differential group delay can be achieved.

FIG. 15 illustrates a temperature insensitive DGD used in FIGS. 1-5 and 12-14, which is made with two different birefringence crystals of opposite temperature coefficients of birefringence. For example, YVO4 and LiNOb3. When the lengths of the two different crystals are chosen, zero temperature coefficients of differential group delay can be achieved.

In implementations, the DGD in FIGS. 1-5 and FIGS. 12-14 can be made variable using multiple pieces of birefringence material and polarization switches, as disclosed previously in U.S. Pat. Nos. 5,978,125; 5,796,510; RE38,809E1; RE38,735E1 and in publications (L.S. Yan et al, "programmable Group Delay Module using binary polarization switching," IEEE J. of Lightwave Technology, Vol. 21, no. 7, 2003).

Figure 16:
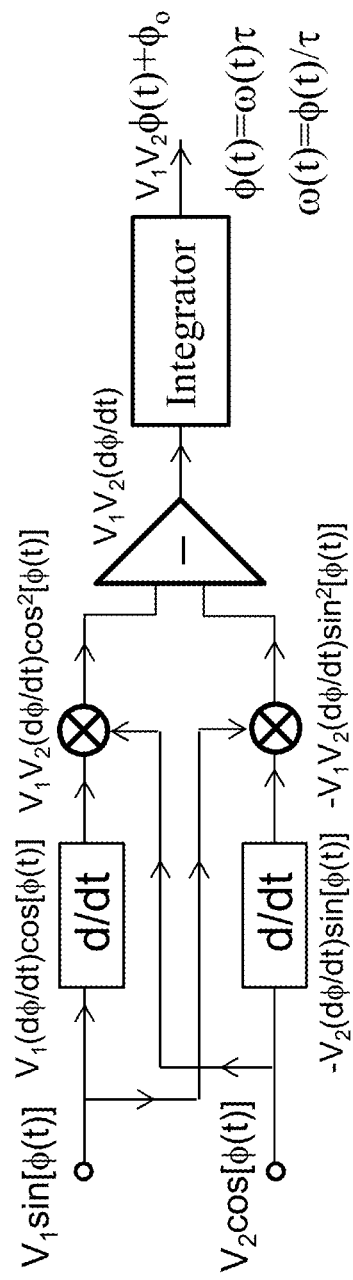
FIG. 16 shows an example of an analog circuit for processing measurement and calculating the instant phase or frequency of the light signal under detection based on the disclosed technology.

FIG. 16 illustrates an analog circuit for calculating the instant phase or frequency of the light signal from the sine and cosine signals from the frequency encoder described in FIGS. 3-14. The procedure or algorithm described in this analog circuitry can also be implemented digitally after the sine and cosine signals are digitized.

Figure 17A:
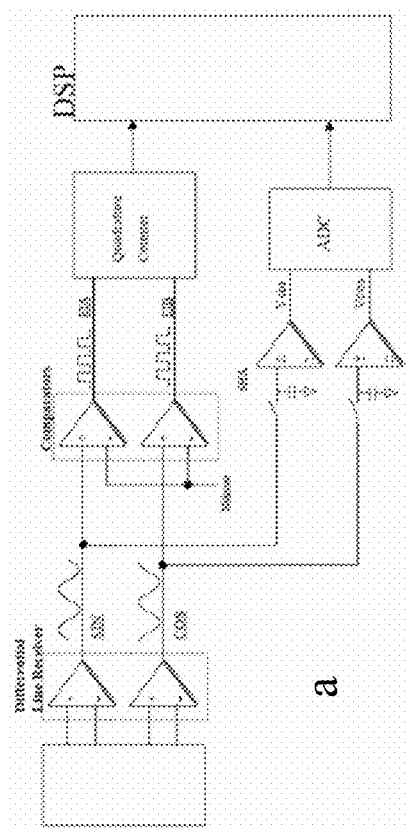
FIG. 17 shows an example of a digital circuit for obtaining the instant phase or frequency of the light signal based on the disclosed technology. The comparators in FIG. 17A are to get the zero crossing positions for period counting, as shown in the top and middle graphs in FIG. 17B. The ADC in FIG. 17A is to digitize the data and then the DSP is used to calculate the instant phase using q=tan−1(sin Y1/cos Y2), as shown in the bottom graph in FIG. 17B.
Figure 17B:
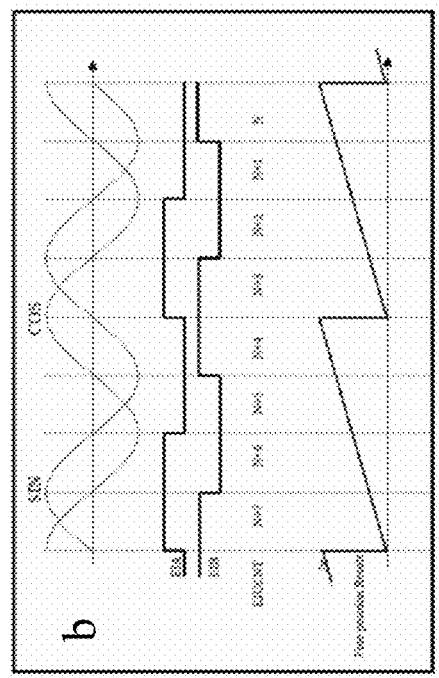

FIG. 17 illustrates a digital method for interpolating the sine and cosine signals obtained by the frequency encoders described in FIGS. 3-14. The comparators in FIG. 17A are to get the zero crossing positions for period counting, as shown in the top and middle graphs in FIG. 17B. The analog-to-digital converter (ADC) in FIG. 17A is to digitize the data and then the digital signal processing unit (DSP) is used to calculate the instant phase using $\theta=\tan^{-1}$ (sin Y1/cos Y2), as shown in the bottom graph in FIG. 17B.

The optical frequency encoders described in FIGS. 1 to 15 are so called incremental encoders which only measure the amount of change of the optical frequency. For some applications, the measure of the absolute optical frequency is required. One may use the molecular gas cells with multiple spectral absorption lines, such as carbon monoxide, acetylene, and hydrogen cyanide, to get the absolute optical frequency readings at the absorptions peaks. The frequency fall between the absorption lines can be linearly interpolated.

Figure 18:
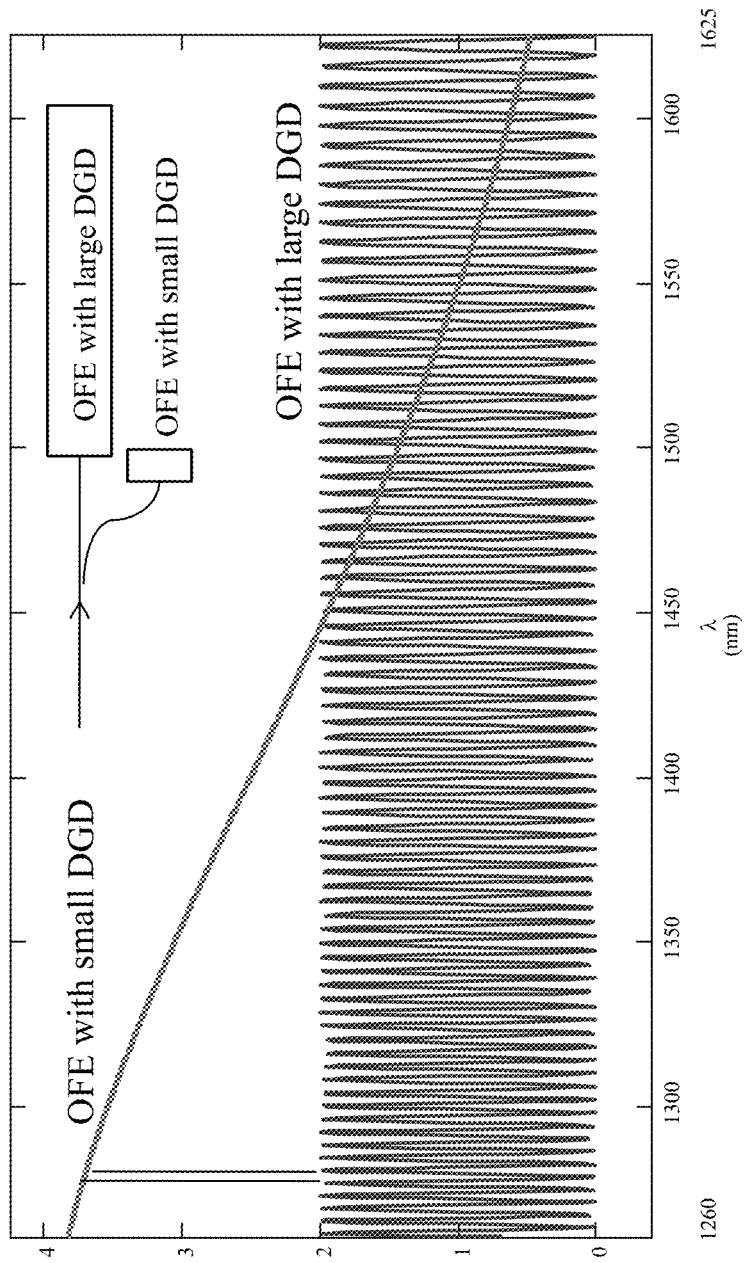
FIG. 18 shows an example of a device combining an optical frequency encoder (OFE) of a small DGD described in FIGS. 1-14 and an OFE of a large DGD described in FIGS. 1-14 to make the absolute frequency encoder based on the disclosed technology. The value of the small DGD is chosen such that in the frequency (or wavelength) range of interest, the detected optical power change is limited in the first quarter of the cosine function for the coarse absolute optical frequency measurement, as shown in the figure. Within this quarter period, there many a large amount of periods produced by the OFE of the large DGD. So long as the frequency resolution of the OFE is sufficiently fine to resolve a period of the OFE of the large DGD, the absolute frequency of the light source can be obtained unambiguously.

FIG. 18 illustrates using the combination of an optical frequency encoder (OFE) of a small DGD described in FIGS. 1-14 and an OFE of a large DGD described in FIGS. 1-14 to make the absolute frequency encoder. The value of the small DGD is chosen such that in the frequency (or wavelength) range of interest, the detected optical power change is limited in the first quarter of the cosine function for the coarse absolute optical frequency measurement, as shown in the figure. Within this quarter period, there may be large amounts of periods produced by the OFE of the large DGD. So long as the frequency resolution of the OFE is sufficiently fine to resolve a period of the OFE of the large DGD, the absolute frequency of the light source can be obtained unambiguously.

Figure 19:
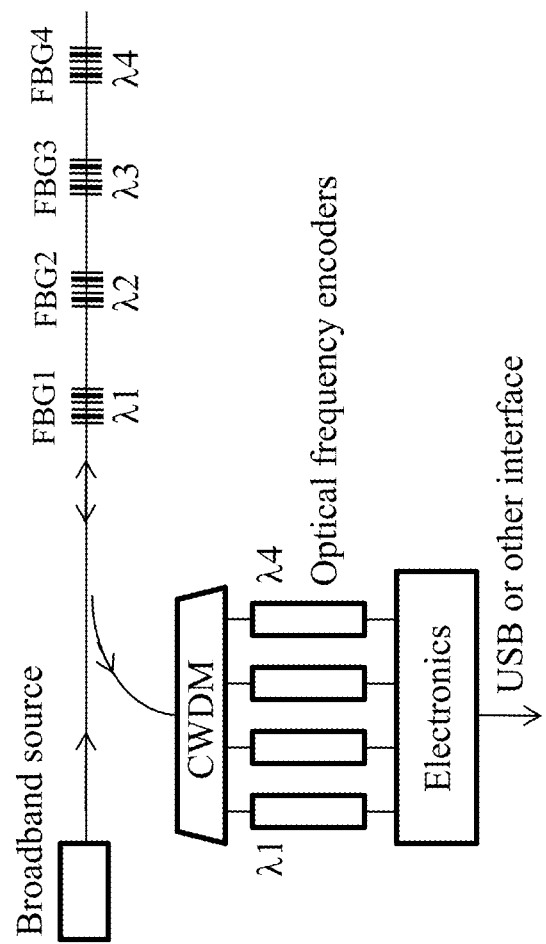
FIG. 19 shows an example of optical frequency encoders (OFE) for fiber Bragg grating (FBG) interrogation based on the disclosed technology. A broadband light source, such as ASE or SLED, is injected into the fiber and 4 FBG's reflect different wavelengths towards the course WDM (CWDM) for separating them into 4° F.E's. The wavelength shift of the reflected light caused by the temperature or strain in the FBG can be precisely detected by the OFE.

FIG. 19 illustrates using optical frequency encoders (OFE) for fiber Bragg grating (FBG) interrogation. A broadband light source, such as ASE or SLED, is injected into the fiber and 4 FBG's reflect different wavelengths towards the course WDM (CWDM) for separating them into 4° F.E's. The wavelength shift of the reflected light caused by the temperature or strain in the FBG can be precisely detected by the OFE. The sine/cosine optical encoder based FBG interrogator has the advantages of higher speed and finer spectrum resolution than the various conventional FBG interrogators based spectrum analyzers. More FBG's can be included in the system by increasing the number of OFE's in the system.

Figure 20:
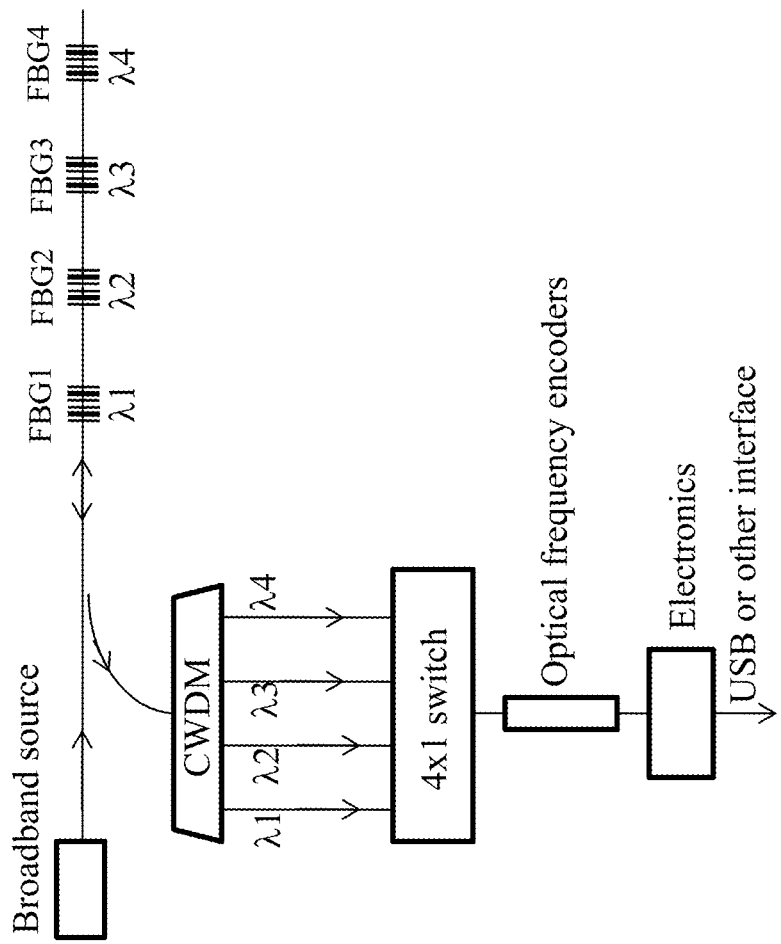
FIG. 20 shows an example of a device using optical frequency encoders (OFE) for fiber Bragg grating (FBG) interrogation based on the disclosed technology. A broadband light source, such as ASE or SLED, is injected into the fiber and 4 FBG's reflect different wavelengths towards the course WDM (CWDM) for separating them into branches. A 4×1 optical switch is used to connect one of the branch to the OFE for measuring the wavelength changes caused by the temperature or strain in the FBG's. Here only one OFE is required to interrogating multiple FGB's.

FIG. 20 illustrates using an optical frequency encoders (OFE) for fiber Bragg grating (FBG) interrogation. A broadband light source, such as ASE or SLED, is injected into the fiber and 4 FBG's reflect different wavelengths towards the course WDM (CWDM) for separating them into branches. A 4×1 optical switch is used to connect one of the branch to the OFE for measuring the wavelength changes caused by the temperature or strain in the FBG's. Here only one OFE is required to interrogating multiple FGB's for reducing the cost by compromising the measurement speed. More FBG's can be included in the system by increasing the number of ports in the optical switch.

Figure 21:
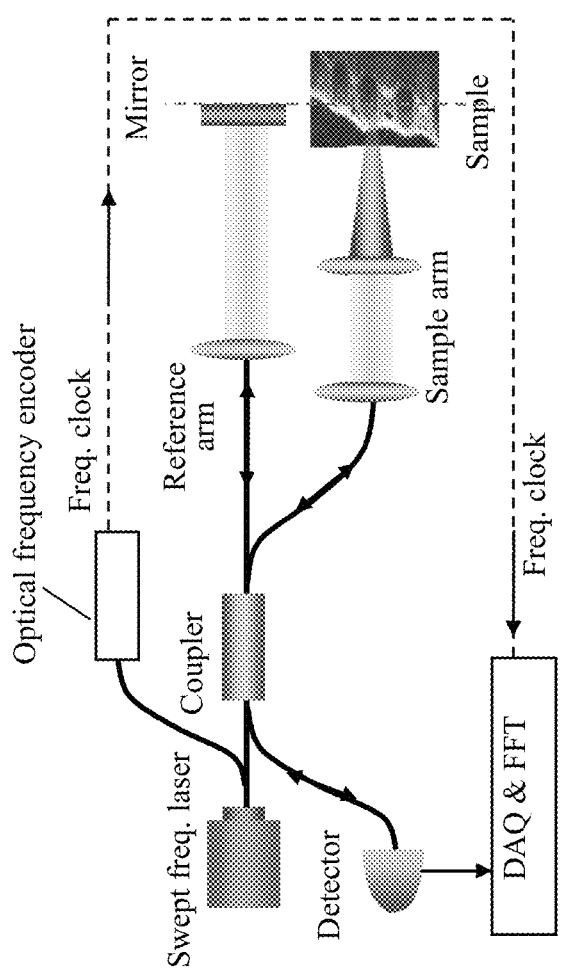
FIG. 21 shows an example of an OCT device using an optical frequency encoder (OFE) for generating frequency clock signal for triggering the data acquisition. The precise frequency clock signal is essential for determining the depth information of the OCT images.

FIG. 21 illustrates using an optical frequency encoders (OFE) for generating frequency clock signal for triggering the data acquisition in an OCT system. The precise frequency clock signal is essential for determining the depth information of the OCT images.

Figure 22:
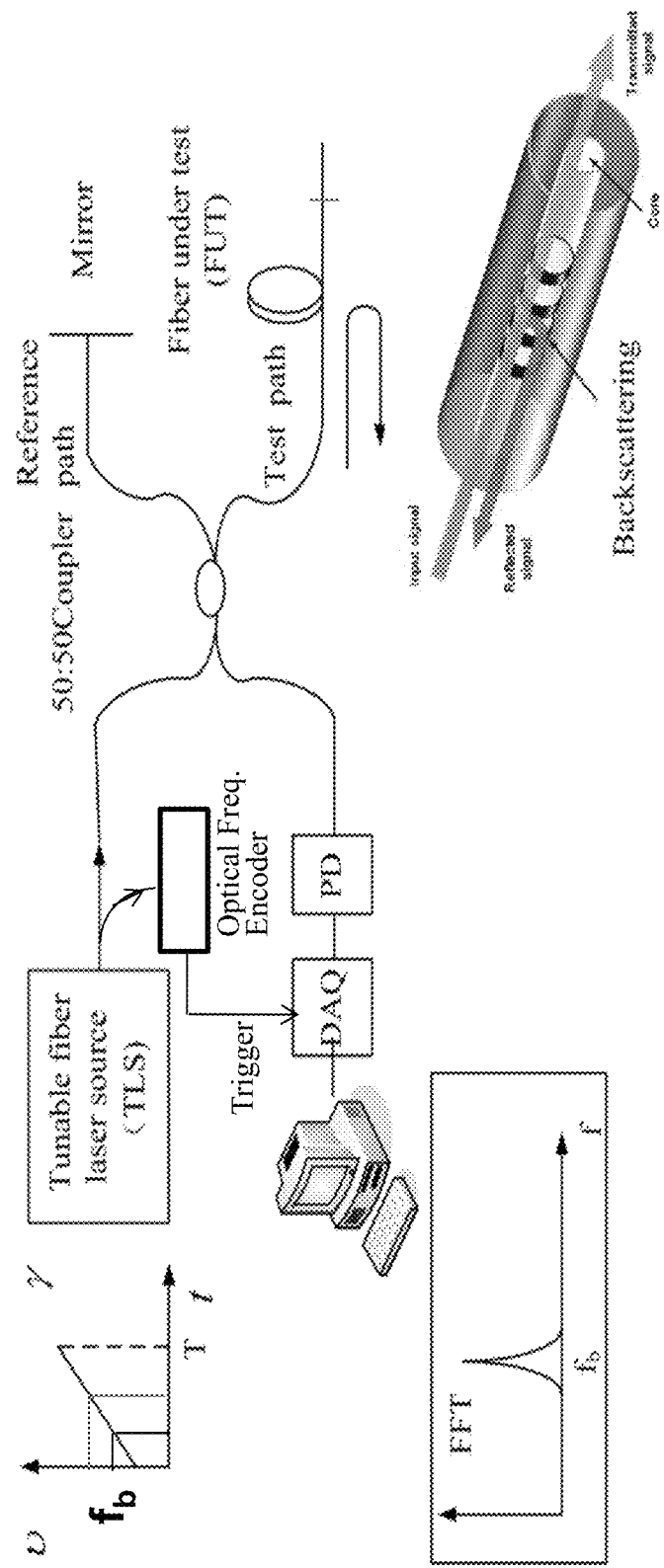
FIG. 22 shows an example of an OFDR sensor system using an optical frequency encoder (OFE). The laser frequency can be tuned linearly, the back scattered light at every point along the fiber interferes with the reference light, scattered light at different locations corresponds to different beat frequencies. After performing FFT, the scattering/reflection as a function of distance is obtained. Because the tunable laser may not be linear, an optical encoder for obtaining the instant frequency to trigger the data requisition is required.

FIG. 22 illustrates using an optical frequency encoder (OFE) in an Optical Frequency Domain Reflectometer (OFDR) sensor system. Ideally, the laser frequency is tuned linearly and the back scattered light at every point along the fiber interferes with the reference light. The scattered light at different locations corresponds to different beat frequency. After performing FFT, the scattering/reflection as a function of distance is obtained. Because the tunable laser may not be linear, an optical encoder for obtaining the instant frequency to trigger the data requisition is required.

Figure 23:
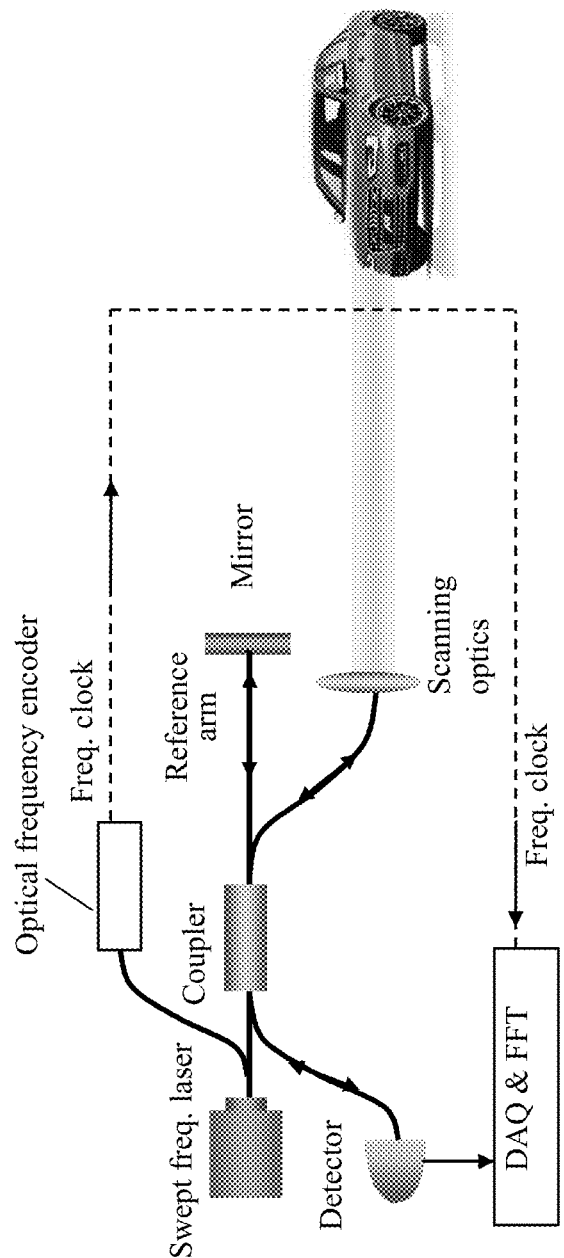
FIG. 23 shows an example of a chirped Lidar system for triggering data acquisition using an optical frequency encoders (OFE) in which the precisely known frequency is important for obtaining the accurate distance information of the object.

FIG. 23 illustrates using an optical frequency encoder (OFE) in a chirped Lidar system for triggering data acquisition. In such a system, the precisely known frequency is essential for obtaining the accurate distance information of the object.

Figure 24:
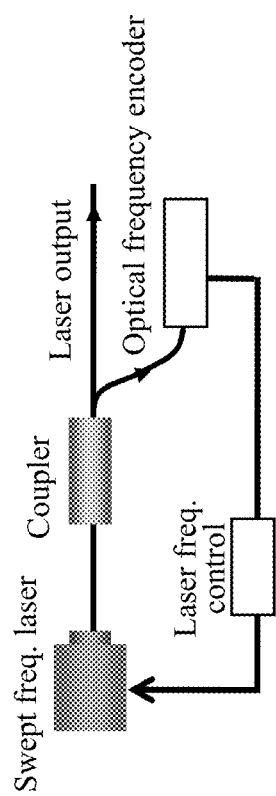
FIG. 24 shows an example of a device using an optical frequency encoder (OFE) for monitoring and control the laser frequency in which various waveforms of the optical frequency can be generated for advanced applications.

FIG. 24 illustrates using an optical frequency encoder (OFE) for monitoring and control the laser frequency. With such an OFE in the system, arbitrary waveform of optical frequency can be generated for advanced applications.

While this patent document contains many specifics, these should not be construed as limitations on the scope of any disclosed technology or of what may be claimed, but rather as descriptions of features that may be specific to particular embodiments of particular disclosed technology. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An optical frequency encoder device for measuring an optical frequency of light, comprising:
   an input port that receives light at an optical frequency to be measured;
   an optical polarizer in an optical path of the received light to output light in an input optical polarization;
   an optical differential delay (DGD) device oriented to have two orthogonal optical polarization axes of the DGD device to be at 45 degrees with respect to the input optical polarization and located to receive the light from the optical polarizer to cause a delay between light components in two orthogonal optical polarization axes of the DGD device;
   a second optical polarizer coupled to receive output light from the optical DGD device to produce an optical output beam;
   an optical detector coupled to receive the optical output beam and to produce a detector signal; and
   a processor coupled to receive the detector signal and to determine the optical frequency based on a measurement of a power level of the light received at the optical detector.

2. The optical frequency encoder device as in claim 1, wherein the processor is coupled to receive the detector signal and to determine the optical frequency based on a power ratio of the optical output beam output by the second optical polarizer and a total optical power of the two light beams in orthogonal optical polarizations output by the DGD device.

3. The optical frequency encoder device as in claim 1, wherein: the second optical polarizer is oriented to select light at a polarization that is parallel to one of the polarization axes of the DGD device for optical detection at the optical detector.

4. The optical frequency encoder device as in claim 3, wherein:
   the second optical polarizer is structured as an optical polarization beam splitter to further select light at a second polarization that is perpendicular to the polarization selected for the light to be detected by the optical detector to produce a second light beam; and
   the optical frequency encoder device further includes a second optical detector placed to detect the light at the second polarization to produce a second detector signal,
   wherein the processor is coupled to receive and process both the detector signal and the second detector signal to determine the optical frequency.

5. The optical frequency encoder device as in claim 4, wherein the optical detector and the second optical detector are formed on a common chip.

6. The optical frequency encoder device as in claim 1, comprising:
   an optical beam splitter placed to receive light out of the DGD device and to split the received light out of the DGD device into a first beam along a first optical path to pass through the second optical polarizer and a second beam along a different second optical path;
   a third optical polarizer placed in the second optical path of the second beam select light at a second polarization that is perpendicular to the polarization selected for the light to be detected by the optical detector to produce a second polarized light beam; and
   a second optical detector placed to receive the second polarized light beam and to produce a second detector signal,
   wherein the processor is coupled to receive and process both the detector signal and the second detector signal to determine the optical frequency.

7. The optical frequency encoder device as in claim 6, further comprising a quarter wave plate that is placed in front of one of the second optical polarizer or the third optical polarizer, wherein fast and slow polarization axes of the quarter wave plate are oriented relative to polarization axes of the DGD device to cause the detector signal and the second detector signal to be sinusoidal signals with a relative phase difference close to 90 degrees and that vary with a retardation value between two orthogonal polarizations of the DGD device.

8. A system for optical imaging, comprising:
   a laser that produces probe laser light at a probe laser frequency and is operable to tune the probe laser frequency to different laser frequencies;
   an optical frequency encoder device as in claim 1 and coupled to receive a portion of the probe laser light from the laser to measure the optical frequency information of the probe laser light;
   an optical coupler coupled to receive the probe laser light from the laser and to split the received probe laser light into a reference probe laser beam and a sampling probe laser beam;
   a reference optical path that is coupled to receive the reference probe laser beam and includes a reference reflector that reflects the reference probe laser beam back to retrace back to the optical coupler;

a sampling optical path that is coupled to receive the sampling probe laser beam and includes an optical probe head that directs the sampling probe laser beam onto a target to be imaged and to receive reflected sampling probe laser beam carrying image information of the target and to direct the reflected sampling probe laser beam to the optical coupler via the sampling optical path, wherein the optical coupler combines the reflected sampling probe laser beam from the target and the reflected reference probe laser beam to produce a combined laser beam;

an optical detector located to receive the combined laser beam from the optical coupler and to produce a detector signal; and a processor module coupled to receive the detector signal and operable to perform Fast Fourier transform on the detector signal using a frequency clock signal based on the optical frequency information of the probe laser light from the optical frequency encoder device and to extract image information of the target.

9. The system as in claim 8, wherein the reference optical path and sampling optical path form a frequency domain optical coherence tomography imaging system.

10. A system for optically sensing a fiber under test, comprising:

a laser that produces probe laser light at a probe laser frequency and is operable to tune the probe laser frequency to different laser frequencies;

an optical frequency encoder device as in claim 1 and coupled to receive a portion of the probe laser light from the laser to measure the optical frequency information of the probe laser light;

an optical coupler coupled to receive the probe laser light from the laser and to split the received probe laser light into a reference probe laser beam and a sampling probe laser beam;

a reference optical path that is coupled to receive the reference probe laser beam and includes a reference reflector that reflects the reference probe laser beam back to retrace back to the optical coupler;

a sampling optical path that is coupled to receive the sampling probe laser beam and directs the sampling probe laser beam into a fiber under test and to receive reflected sampling probe laser beam carrying information of the fiber under test and to direct the reflected sampling probe laser beam to the optical coupler via the sampling optical path, wherein the optical coupler combines the reflected sampling probe laser beam from the target and the reflected reference probe laser beam to produce a combined laser beam;

an optical detector located to receive the combined laser beam from the optical coupler and to produce a detector signal; and a processor module coupled to receive the detector signal and operable to perform Fast Fourier transform on the detector signal using a frequency clock signal based on the optical frequency information of the probe laser light from the optical frequency encoder device and to extract information of the fiber under test.

11. A light detection and ranging (LIDAR) system, comprising:

a laser that produces probe laser light at a probe laser frequency and is operable to tune the probe laser frequency to different laser frequencies;

an optical frequency encoder device as in claim 1 and coupled to receive a portion of the probe laser light from the laser to measure the optical frequency information of the probe laser light;

an optical coupler coupled to receive the probe laser light from the laser and to split the received probe laser light into a reference probe laser beam and a sampling probe laser beam;

a reference optical path that is coupled to receive the reference probe laser beam and includes a reference reflector that reflects the reference probe laser beam back to retrace back to the optical coupler;

a sampling optical path that is coupled to receive the sampling probe laser beam and includes an optical scanner that scans the sampling probe laser beam into a surrounding area to detect an object in an optical path of the scanned sampling probe laser beam and to receive reflected sampling probe laser beam carrying information of an object that reflects light and to direct the reflected sampling probe laser beam to the optical coupler via the sampling optical path, wherein the optical coupler combines the reflected sampling probe laser beam from the target and the reflected reference probe laser beam to produce a combined laser beam;

an optical detector located to receive the combined laser beam from the optical coupler and to produce a detector signal; and a processor module coupled to receive the detector signal and operable to perform Fast Fourier transform on the detector signal using a frequency clock signal based on the optical frequency information of the probe laser light from the optical frequency encoder device and to extract information of the object.

12. A system for optical imaging, comprising:

a laser that produces probe laser light at a probe laser frequency and is operable to tune the probe laser frequency to different laser frequencies;

an optical frequency encoder device as in claim 7 and coupled to receive a portion of the probe laser light from the laser to measure the optical frequency information of the probe laser light;

an optical coupler coupled to receive the probe laser light from the laser and to split the received probe laser light into a reference probe laser beam and a sampling probe laser beam;

a reference optical path that is coupled to receive the reference probe laser beam and includes a reference reflector that reflects the reference probe laser beam back to retrace back to the optical coupler;

a sampling optical path that is coupled to receive the sampling probe laser beam and includes an optical probe head that directs the sampling probe laser beam onto a target to be imaged and to receive reflected sampling probe laser beam carrying image information of the target and to direct the reflected sampling probe laser beam to the optical coupler via the sampling optical path, wherein the optical coupler combines the reflected sampling probe laser beam from the target and the reflected reference probe laser beam to produce a combined laser beam;

an optical detector located to receive the combined laser beam from the optical coupler and to produce a detector signal; and a processor module coupled to receive the detector signal and operable to perform Fast Fourier transform on the detector signal using a frequency clock signal based on the optical frequency information of the probe laser light from the optical frequency encoder device and to extract image information of the target.

13. The system as in claim 12, wherein the reference optical path and sampling optical path form a frequency domain optical coherence tomography imaging system.

14. A system for optically sensing a fiber under test, comprising:
a laser that produces probe laser light at a probe laser frequency and is operable to tune the probe laser frequency to different laser frequencies;
an optical frequency encoder device as in claim 7 and coupled to receive a portion of the probe laser light from the laser to measure the optical frequency information of the probe laser light;
an optical coupler coupled to receive the probe laser light from the laser and to split the received probe laser light into a reference probe laser beam and a sampling probe laser beam;
a reference optical path that is coupled to receive the reference probe laser beam and includes a reference reflector that reflects the reference probe laser beam back to retrace back to the optical coupler;
a sampling optical path that is coupled to receive the sampling probe laser beam and directs the sampling probe laser beam into a fiber under test and to receive reflected sampling probe laser beam carrying information of the fiber under test and to direct the reflected sampling probe laser beam to the optical coupler via the sampling optical path, wherein the optical coupler combines the reflected sampling probe laser beam from the target and the reflected reference probe laser beam to produce a combined laser beam;
an optical detector located to receive the combined laser beam from the optical coupler and to produce a detector signal; and
a processor module coupled to receive the detector signal and operable to perform Fast Fourier transform on the detector signal using a frequency clock signal based on the optical frequency information of the probe laser light from the optical frequency encoder device and to extract information of the fiber under test.

15. A light detection and ranging (LIDAR) system, comprising:
a laser that produces probe laser light at a probe laser frequency and is operable to tune the probe laser frequency to different laser frequencies;
an optical frequency encoder device as in claim 7 and coupled to receive a portion of the probe laser light from the laser to measure the optical frequency information of the probe laser light;
an optical coupler coupled to receive the probe laser light from the laser and to split the received probe laser light into a reference probe laser beam and a sampling probe laser beam;
a reference optical path that is coupled to receive the reference probe laser beam and includes a reference reflector that reflects the reference probe laser beam back to retrace back to the optical coupler;
a sampling optical path that is coupled to receive the sampling probe laser beam and includes an optical scanner that scans the sampling probe laser beam into a surrounding area to detect an object in an optical path of the scanned sampling probe laser beam and to receive reflected sampling probe laser beam carrying information of an object that reflects light and to direct the reflected sampling probe laser beam to the optical coupler via the sampling optical path, wherein the optical coupler combines the reflected sampling probe laser beam from the target and the reflected reference probe laser beam to produce a combined laser beam;
an optical detector located to receive the combined laser beam from the optical coupler and to produce a detector signal; and
a processor module coupled to receive the detector signal and operable to perform Fast Fourier transform on the detector signal using a frequency clock signal based on the optical frequency information of the probe laser light from the optical frequency encoder device and to extract information of the object.

16. An optical frequency encoder device for measuring an optical frequency of light, comprising:
an input port that receives light at an optical frequency to be measured;
an input optical polarizer in an optical path of the received light to output light in an input optical polarization;
an optical differential delay (DGD) device oriented to have two orthogonal optical polarization axes of the DGD device to be at 45 degrees with respect to the input optical polarization and located to receive the light from the input optical polarizer to cause a delay between light components in two orthogonal optical polarization axes of the DGD device;
an optical beam splitter placed to receive light out of the DGD device and to split the received light out of the DGD device into a first beam along a first optical path and a second beam along a different second optical path;
a first optical polarizer in the first optical path to receive from the first beam to produce a first polarized beam in a first polarization;
a first optical detector in the first optical path to receive the first polarized beam to produce a first detector signal;
a second optical polarizer placed in the second optical path of the second beam to produce a second polarized beam at a second polarization that is perpendicular to the first polarization;
a second optical detector placed in the second optical path to receive the second polarized light beam and to produce a second detector signal;
a quarter wave plate that is placed in front of one of either the first optical polarizer or the second optical polarizer, wherein fast and slow polarization axes of the quarter wave plate are oriented relative to polarization axes of the DGD device to cause the first detector signal and the second detector signal to be sinusoidal signals with a relative phase difference close to 90 degrees and that vary with a retardation value between two orthogonal polarizations of the DGD device; and
a processor coupled to receive the first and second detector signals and to process the first and second detector signals to determine the optical frequency.

17. The optical frequency encoder device as in claim 16, wherein: the first optical polarizer is a first optical polarization beam splitter that splits the first beam into the first polarized beam in the first polarization and an additional first polarized beam in the second polarization;
the optical frequency encoder device further includes an additional first optical detector placed to detect the additional first polarized beam in the second polarization to produce an additional first detector signal;
the quarter wave plate is placed in the second optical path between the optical beam splitter and the second optical polarizer;

the second optical polarizer is a second polarization beam splitter that splits the second beam into the second polarized beam in the second polarization and an additional second polarized beam in the first polarization;

the optical frequency encoder device further includes an additional second optical detector placed to detect the additional second polarized beam in the first polarization to produce an additional second detector signal; and the processor is coupled to receive, in addition to the first and second detector signals, the additional first and second detector signals, and to process the first and second detector signals and the additional first and second detector signals to determine the optical frequency.

18. The optical frequency encoder device as in claim 17, wherein: the DGD device includes different segments of birefringence crystals placed in series that exhibit different temperature coefficients of birefringence to reduce a temperature dependence.

19. The optical frequency encoder device as in claim 16, wherein: the first optical polarizer is a first Wollaston prism that splits the first beam into the first polarized beam in the first polarization and an additional first polarized beam in the second polarization;

the optical frequency encoder device further includes an additional first optical detector placed to detect the additional first polarized beam in the second polarization to produce an additional first detector signal;

the quarter wave plate is placed in the second optical path between the optical beam splitter and the second optical polarizer;

the second optical polarizer is a second Wollaston prism that splits the second beam into the second polarized beam in the second polarization and an additional second polarized beam in the first polarization;

the optical frequency encoder device further includes an additional second optical detector placed to detect the additional second polarized beam in the first polarization to produce an additional second detector signal; and the processor is coupled to receive, in addition to the first and second detector signals, the additional first and second detector signals, and to process the first and second detector signals and the additional first and second detector signals to determine the optical frequency.

20. The optical frequency encoder device as in claim 19, wherein: the DGD device includes different segments of birefringence crystals placed in series that exhibit different temperature coefficients of birefringence to reduce a temperature dependence.

21. A system for optical imaging, comprising:
a laser that produces probe laser light at a probe laser frequency and is operable to tune the probe laser frequency to different laser frequencies;
an optical frequency encoder device as in claim 16 and coupled to receive a portion of the probe laser light from the laser to measure the optical frequency information of the probe laser light;
an optical coupler coupled to receive the probe laser light from the laser and to split the received probe laser light into a reference probe laser beam and a sampling probe laser beam;
a reference optical path that is coupled to receive the reference probe laser beam and includes a reference reflector that reflects the reference probe laser beam back to retrace back to the optical coupler;
a sampling optical path that is coupled to receive the sampling probe laser beam and includes an optical probe head that directs the sampling probe laser beam onto a target to be imaged and to receive reflected sampling probe laser beam carrying image information of the target and to direct the reflected sampling probe laser beam to the optical coupler via the sampling optical path, wherein the optical coupler combines the reflected sampling probe laser beam from the target and the reflected reference probe laser beam to produce a combined laser beam;
an optical detector located to receive the combined laser beam from the optical coupler and to produce a detector signal; and
a processor module coupled to receive the detector signal and operable to perform Fast Fourier transform on the detector signal using a frequency clock signal based on the optical frequency information of the probe laser light from the optical frequency encoder device and to extract image information of the target.

22. The system as in claim 21, wherein the reference optical path and sampling optical path form a frequency domain optical coherence tomography imaging system.

23. A system for optically sensing a fiber under test, comprising:
a laser that produces probe laser light at a probe laser frequency and is operable to tune the probe laser frequency to different laser frequencies;
an optical frequency encoder device as in claim 16 and coupled to receive a portion of the probe laser light from the laser to measure the optical frequency information of the probe laser light;
an optical coupler coupled to receive the probe laser light from the laser and to split the received probe laser light into a reference probe laser beam and a sampling probe laser beam;
a reference optical path that is coupled to receive the reference probe laser beam and includes a reference reflector that reflects the reference probe laser beam back to retrace back to the optical coupler;
a sampling optical path that is coupled to receive the sampling probe laser beam and directs the sampling probe laser beam into a fiber under test and to receive reflected sampling probe laser beam carrying information of the fiber under test and to direct the reflected sampling probe laser beam to the optical coupler via the sampling optical path, wherein the optical coupler combines the reflected sampling probe laser beam from the target and the reflected reference probe laser beam to produce a combined laser beam;
an optical detector located to receive the combined laser beam from the optical coupler and to produce a detector signal; and
a processor module coupled to receive the detector signal and operable to perform Fast Fourier transform on the detector signal using a frequency clock signal based on the optical frequency information of the probe laser light from the optical frequency encoder device and to extract information of the fiber under test.

24. A light detection and ranging (LIDAR) system, comprising:
a laser that produces probe laser light at a probe laser frequency and is operable to tune the probe laser frequency to different laser frequencies;

an optical frequency encoder device as in claim 16 and coupled to receive a portion of the probe laser light from the laser to measure the optical frequency information of the probe laser light;

an optical coupler coupled to receive the probe laser light from the laser and to split the received probe laser light into a reference probe laser beam and a sampling probe laser beam;

a reference optical path that is coupled to receive the reference probe laser beam and includes a reference reflector that reflects the reference probe laser beam back to retrace back to the optical coupler;

a sampling optical path that is coupled to receive the sampling probe laser beam and includes an optical scanner that scans the sampling probe laser beam into a surrounding area to detect an object in an optical path of the scanned sampling probe laser beam and to receive reflected sampling probe laser beam carrying information of an object that reflects light and to direct the reflected sampling probe laser beam to the optical coupler via the sampling optical path, wherein the optical coupler combines the reflected sampling probe laser beam from the target and the reflected reference probe laser beam to produce a combined laser beam;

an optical detector located to receive the combined laser beam from the optical coupler and to produce a detector signal; and a processor module coupled to receive the detector signal and operable to perform Fast Fourier transform on the detector signal using a frequency clock signal based on the optical frequency information of the probe laser light from the optical frequency encoder device and to extract information of the object.

25. An optical frequency encoder device for measuring an optical frequency of light, comprising:

an input port that receives light at an optical frequency to be measured;

an input optical polarization device placed in an optical path of the received light and structured to interact with optical polarization of the received light to output first and second light beams with orthogonal optical polarizations;

a polarization rotator placed in the first light beam to rotate polarization by 90 degrees;

an optical differential delay (DGD) device coupled to receive the first and second light beams to cause a delay between the first and second light;

an input optical polarizer placed between the polarization rotator and the DGD device and structured to have a polarization axis at 45 degrees with respect to two orthogonal optical polarization axes of the DGD device;

an optical beam splitter placed to receive light out of the DGD device and to split the received light out of the DGD device into a first beam along a first optical path and a second beam along a different second optical path;

a first optical polarizer in the first optical path to receive from the first beam to produce a first polarized beam in a first polarization;

a first optical detector in the first optical path to receive the first polarized beam to produce a first detector signal;

a second optical polarizer placed in the second optical path of the second beam to produce a second polarized beam at a second polarization that is perpendicular to the first polarization;

a second optical detector placed in the second optical path to receive the second polarized light beam and to produce a second detector signal;

a quarter wave plate that is placed in front of one of either the first optical polarizer or the second optical polarizer, wherein fast and slow polarization axes of the quarter wave plate are oriented relative to polarization axes of the DGD device to cause the first detector signal and the second detector signal to be sinusoidal signals with a relative phase difference close to 90 degrees and that vary with a retardation value between two orthogonal polarizations of the DGD device; and a processor coupled to receive the first and second detector signals and to process the first and second detector signals to determine the optical frequency.

26. The optical frequency encoder device as in claim 25, wherein: the DGD device includes different segments of birefringence crystals placed in series that exhibit different temperature coefficients of birefringence to reduce a temperature dependence.

27. The optical frequency encoder device as in claim 25, wherein: the first optical polarizer is a first optical polarization beam splitter that splits the first beam into the first polarized beam in the first polarization and an additional first polarized beam in the second polarization;

the optical frequency encoder device further includes an additional first optical detector placed to detect the additional first polarized beam in the second polarization to produce an additional first detector signal;

the quarter wave plate is placed in the second optical path between the optical beam splitter and the second optical polarizer;

the second optical polarizer is a second polarization beam splitter that splits the second beam into the second polarized beam in the second polarization and an additional second polarized beam in the first polarization;

the optical frequency encoder device further includes an additional second optical detector placed to detect the additional second polarized beam in the first polarization to produce an additional second detector signal; and the processor is coupled to receive, in addition to the first and second detector signals, the additional first and second detector signals, and to process the first and second detector signals and the additional first and second detector signals to determine the optical frequency.

28. The optical frequency encoder device as in claim 27, wherein: the DGD device includes different segments of birefringence crystals placed in series that exhibit different temperature coefficients of birefringence to reduce a temperature dependence.

29. The optical frequency encoder device as in claim 25, wherein:

the first optical polarizer is a first Wollaston prism that splits the first beam into the first polarized beam in the first polarization and an additional first polarized beam in the second polarization;

the optical frequency encoder device further includes an additional first optical detector placed to detect the additional first polarized beam in the second polarization to produce an additional first detector signal;

the quarter wave plate is placed in the second optical path between the optical beam splitter and the second optical polarizer;

the second optical polarizer is a second Wollaston prism that splits the second beam into the second polarized beam in the second polarization and an additional second polarized beam in the first polarization;

the optical frequency encoder device further includes an additional second optical detector placed to detect the additional second polarized beam in the first polarization to produce an additional second detector signal; and the processor is coupled to receive, in addition to the first and second detector signals, the additional first and second detector signals, and to process the first and second detector signals and the additional first and second detector signals to determine the optical frequency.

30. The optical frequency encoder device as in claim 29, wherein: the DGD device includes different segments of birefringence crystals placed in series that exhibit different temperature coefficients of birefringence to reduce a temperature dependence.

31. A system for optical imaging, comprising:
a laser that produces probe laser light at a probe laser frequency and is operable to tune the probe laser frequency to different laser frequencies;
an optical frequency encoder device as in claim 25 and coupled to receive a portion of the probe laser light from the laser to measure the optical frequency information of the probe laser light;
an optical coupler coupled to receive the probe laser light from the laser and to split the received probe laser light into a reference probe laser beam and a sampling probe laser beam;
a reference optical path that is coupled to receive the reference probe laser beam and includes a reference reflector that reflects the reference probe laser beam back to retrace back to the optical coupler;
a sampling optical path that is coupled to receive the sampling probe laser beam and includes an optical probe head that directs the sampling probe laser beam onto a target to be imaged and to receive reflected sampling probe laser beam carrying image information of the target and to direct the reflected sampling probe laser beam to the optical coupler via the sampling optical path, wherein the optical coupler combines the reflected sampling probe laser beam from the target and the reflected reference probe laser beam to produce a combined laser beam;
an optical detector located to receive the combined laser beam from the optical coupler and to produce a detector signal; and
a processor module coupled to receive the detector signal and operable to perform Fast Fourier transform on the detector signal using a frequency clock signal based on the optical frequency information of the probe laser light from the optical frequency encoder device and to extract image information of the target.

32. The system as in claim 31, wherein the reference optical path and sampling optical path form a frequency domain optical coherence tomography imaging system.

33. A system for optically sensing a fiber under test, comprising:
a laser that produces probe laser light at a probe laser frequency and is operable to tune the probe laser frequency to different laser frequencies;
an optical frequency encoder device as in claim 25 and coupled to receive a portion of the probe laser light from the laser to measure the optical frequency information of the probe laser light;
an optical coupler coupled to receive the probe laser light from the laser and to split the received probe laser light into a reference probe laser beam and a sampling probe laser beam;
a reference optical path that is coupled to receive the reference probe laser beam and includes a reference reflector that reflects the reference probe laser beam back to retrace back to the optical coupler;
a sampling optical path that is coupled to receive the sampling probe laser beam and directs the sampling probe laser beam into a fiber under test and to receive reflected sampling probe laser beam carrying information of the fiber under test and to direct the reflected sampling probe laser beam to the optical coupler via the sampling optical path, wherein the optical coupler combines the reflected sampling probe laser beam from the target and the reflected reference probe laser beam to produce a combined laser beam;
an optical detector located to receive the combined laser beam from the optical coupler and to produce a detector signal; and
a processor module coupled to receive the detector signal and operable to perform Fast Fourier transform on the detector signal using a frequency clock signal based on the optical frequency information of the probe laser light from the optical frequency encoder device and to extract information of the fiber under test.

34. A light detection and ranging (LIDAR) system, comprising:
a laser that produces probe laser light at a probe laser frequency and is operable to tune the probe laser frequency to different laser frequencies;
an optical frequency encoder device as in claim 25 and coupled to receive a portion of the probe laser light from the laser to measure the optical frequency information of the probe laser light;
an optical coupler coupled to receive the probe laser light from the laser and to split the received probe laser light into a reference probe laser beam and a sampling probe laser beam;
a reference optical path that is coupled to receive the reference probe laser beam and includes a reference reflector that reflects the reference probe laser beam back to retrace back to the optical coupler;
a sampling optical path that is coupled to receive the sampling probe laser beam and includes an optical scanner that scans the sampling probe laser beam into a surrounding area to detect an object in an optical path of the scanned sampling probe laser beam and to receive reflected sampling probe laser beam carrying information of an object that reflects light and to direct the reflected sampling probe laser beam to the optical coupler via the sampling optical path, wherein the optical coupler combines the reflected sampling probe laser beam from the target and the reflected reference probe laser beam to produce a combined laser beam;
an optical detector located to receive the combined laser beam from the optical coupler and to produce a detector signal; and
a processor module coupled to receive the detector signal and operable to perform Fast Fourier transform on the detector signal using a frequency clock signal based on the optical frequency information of the probe laser light from the optical frequency encoder device and to extract information of the object.

* * * * *